(12) United States Patent
Seo et al.

(10) Patent No.: US 11,731,410 B2
(45) Date of Patent: Aug. 22, 2023

(54) POLYAMIDE-BASED COMPOSITE FILM AND DISPLAY DEVICE COMPRISING THE SAME

(71) Applicants: SK microworks Co., Ltd., Gyeonggi-do (KR); SK microworks solutions Co., Ltd., Chungcheongnam-do (KR)

(72) Inventors: Yun-Hee Seo, Chungcheongnam-do (KR); Sang Hun Choi, Gyeonggi-do (KR); Jung Hee Ki, Gyeonggi-do (KR); Jin Woo Lee, Gyeonggi-do (KR); Dae Seong Oh, Gyeonggi-do (KR); Han Jun Kim, Gyeonggi-do (KR); Sun Hwan Kim, Gyeonggi-do (KR); Heung Sik Kim, Gyeonggi-do (KR)

(73) Assignees: SK MICROWORKS CO., LTD., Gyeonggi-do (KR); SK microworks solutions Co., Ltd., Chungcheongnam-do (KR)

( * ) Notice: Subject to any disclaimer, the term of this patent is extended or adjusted under 35 U.S.C. 154(b) by 0 days.

(21) Appl. No.: 17/730,277

(22) Filed: Apr. 27, 2022

(65) Prior Publication Data

US 2022/0402254 A1     Dec. 22, 2022

(30) Foreign Application Priority Data

May 28, 2021   (KR) ..................... 10-2021-0069308

(51) Int. Cl.
*B32B 27/34*       (2006.01)
*B32B 7/12*        (2006.01)
(Continued)

(52) U.S. Cl.
CPC ............... *B32B 27/34* (2013.01); *B32B 7/12* (2013.01); *B32B 27/08* (2013.01); *B32B 27/20* (2013.01);
(Continued)

(58) Field of Classification Search
CPC .......... B32B 27/34; B32B 7/12; B32B 27/08; B32B 27/20; B32B 27/308;
(Continued)

(56) References Cited

U.S. PATENT DOCUMENTS

2019/0359772 A1   11/2019   Kim et al.
2020/0407507 A1   12/2020   Oh et al.
(Continued)

FOREIGN PATENT DOCUMENTS

EP         4036153 A1    8/2022
KR   10-2020-0096107 A   8/2020
(Continued)

OTHER PUBLICATIONS

Machine translation of WO-2021140927. (Year: 2021).*

(Continued)

*Primary Examiner* — John D Freeman
(74) *Attorney, Agent, or Firm* — IP & T Group LLP

(57) ABSTRACT

The embodiments relate to a polyamide-based composite film that has excellent curl characteristics, mechanical properties, and optical properties, as well as, in particular, is effective in preventing reflection in the visible light region, remarkably reduces the rainbow phenomenon, and achieves a texture similar to that of glass, and a display device comprising the same. There are provided a polyamide-based composite film, which comprises a base film comprising a polyamide-based polymer; and a functional layer disposed on the base film, wherein the in-plane retardation (Re)

(Continued)

measured with light having a wavelength of 550 nm is 100 nm to 220 nm, and a display device comprising the same.

13 Claims, 2 Drawing Sheets

(51) Int. Cl.
*B32B 27/08* (2006.01)
*B32B 27/20* (2006.01)
*B32B 27/30* (2006.01)
*B32B 27/28* (2006.01)

(52) U.S. Cl.
CPC .......... *B32B 27/281* (2013.01); *B32B 27/308* (2013.01); *B32B 2250/02* (2013.01); *B32B 2250/24* (2013.01); *B32B 2264/1021* (2020.08); *B32B 2307/408* (2013.01); *B32B 2307/412* (2013.01); *B32B 2307/536* (2013.01); *B32B 2307/538* (2013.01); *B32B 2307/732* (2013.01); *B32B 2333/08* (2013.01); *B32B 2377/00* (2013.01); *B32B 2457/202* (2013.01); *B32B 2457/206* (2013.01)

(58) Field of Classification Search
CPC ........... B32B 2250/02; B32B 2250/24; B32B 2264/1021; B32B 2307/408; B32B 2307/412; B32B 2307/536; B32B 2307/538; B32B 2307/732; B32B 2333/08; B32B 2377/00; B32B 2457/202; B32B 2457/206; B32B 2255/10; B32B 2255/26; B32B 2264/00; B32B 2264/0257; B32B 2264/101; B32B 2264/102; B32B 2307/40; B32B 2307/406; B32B 27/38; B32B 2264/0235; B32B 2264/025; B32B 2457/20; C08J 5/18; C08J 2377/00; C08J 2475/16; C08J 7/0427; C08J 7/046; C08J 2379/08; C08J 2475/14; C08G 69/32; C08G 73/1039; C08G 73/1067; C08G 73/14; C08K 3/30; C08K 3/40; C08K 2003/3045; C08K 3/36; C09D 175/16; C09D 179/08; C09D 7/61; C09D 175/14; G02B 1/11; G02B 5/30; G02F 1/1335; G02F 1/13363; B02B 1/04

See application file for complete search history.

(56) References Cited

U.S. PATENT DOCUMENTS

| | | |
|---|---|---|
| 2020/0407519 A1 | 12/2020 | Ki et al. |
| 2020/0407522 A1 | 12/2020 | Choi et al. |
| 2021/0096280 A1 | 4/2021 | Kim et al. |
| 2021/0222007 A1 | 7/2021 | Choi et al. |
| 2021/0324145 A1 | 10/2021 | Ahn et al. |
| 2022/0073689 A1* | 3/2022 | Seo .................. C08J 7/046 |

FOREIGN PATENT DOCUMENTS

| | | |
|---|---|---|
| KR | 10-2147297 B1 | 8/2020 |
| KR | 10-2021-0001834 A | 1/2021 |
| KR | 10-2219707 B1 | 2/2021 |
| WO | WO-2021140927 A1 * | 7/2021 |
| WO | 2021/221374 A1 | 11/2021 |

OTHER PUBLICATIONS

Extended European Search Report for the European Patent Application No. 22175275.1 issued by the European Patent Office dated Sep. 2, 2022.
Office Action for Korean Patent Application No. 10-2021-0069308 issued by the Korean Patent Office dated Mar. 30, 2023.

* cited by examiner

POLYAMIDE-BASED COMPOSITE FILM AND DISPLAY DEVICE COMPRISING THE SAME

CROSS-REFERENCE TO RELATED APPLICATION(S)

This application claims benefit of priority to Korean Patent Application No. 10-2021-0069308 filed on May 28, 2021 in the Korean Intellectual Property Office, the disclosure of which is incorporated herein by reference in its entirety.

TECHNICAL FIELD

Embodiments relate to a polyamide-based composite film that is effective in preventing reflection in the visible light region, remarkably reduces the rainbow phenomenon, and achieves a texture similar to that of glass, and to a display device comprising the same.

BACKGROUND ART

Polyamide-based resins such as poly(amide-imide) (PAI) are excellent in resistance to friction, heat, and chemicals. Thus, they are employed in such applications as primary electrical insulation, coatings, adhesives, resins for extrusion, heat-resistant paintings, heat-resistant boards, heat-resistant adhesives, heat-resistant fibers, and heat-resistant films.

Polyamide is used in various fields. For example, polyamide is made in the form of a powder and used as a coating for a metal or a magnetic wire. It is mixed with other additives depending on the application thereof. In addition, polyamide is used to coat kitchenware, used as a membrane for gas separation by virtue of its heat resistance and chemical resistance, and used in natural gas wells for filtration of such contaminants as carbon dioxide, hydrogen sulfide, and impurities.

In recent years, polyamide has been developed in the form of a film, which is less expensive and has excellent optical, mechanical, and thermal characteristics. Such a polyamide-based film may be applied to display materials for organic light-emitting diodes (OLEDs) or liquid crystal displays (LCDs), and the like, and to antireflection films, compensation films, and retardation films if retardation properties are implemented.

DETAILED DESCRIPTION OF THE INVENTION

Technical Problem

An object of the embodiments is to provide a polyamide-based composite film that has excellent curl characteristics, mechanical properties, and optical properties, as well as, in particular, is effective in preventing reflection in the visible light region, remarkably reduces the rainbow phenomenon, and achieves a texture similar to that of glass, and a display device comprising the same.

Solution to the Problem

An embodiment provides a polyamide-based composite film, which comprises a base film comprising a polyamide-based polymer; and a functional layer disposed on the base film, wherein the in-plane retardation (Re) measured with light having a wavelength of 550 nm is 100 nm to 220 nm.

Another embodiment provides a display device, which comprises a display unit; and a polyamide-based composite film disposed on the display unit, wherein the polyamide-based composite film comprises a base film comprising a polyamide-based polymer; and a functional layer disposed on the base film, and the in-plane retardation (Re) of the polyamide-based composite film as measured with light having a wavelength of 550 nm is 100 nm to 220 nm.

Advantageous Effects of the Invention

The polyamide-based composite film according to the embodiment is excellent not only in optical characteristics in terms of high transmittance and low haze, but also in mechanical characteristics in terms of excellent curl characteristics and high surface hardness.

In particular, as the polyamide-based composite film according to the embodiment has a specific level of in-plane retardation, it is effective in preventing reflection in the visible light region, and it can remarkably reduce the rainbow phenomenon. Accordingly, the polyamide-based composite film can technically control the color distortion phenomenon and can achieve an excellent reflective appearance, so that it is suitable for application to a display device.

In addition, the polyamide-based composite film according to the embodiment satisfies a specific level of three-dimensional surface roughness, resulting in a texture similar to that of glass. Thus, when the polyamide-based composite film is applied to a display device, it does not give users a sense of difference in texture, so that it can be advantageously used as a substitutive film for glass.

BEST MODE FOR CARRYING OUT THE INVENTION

Figure 1:
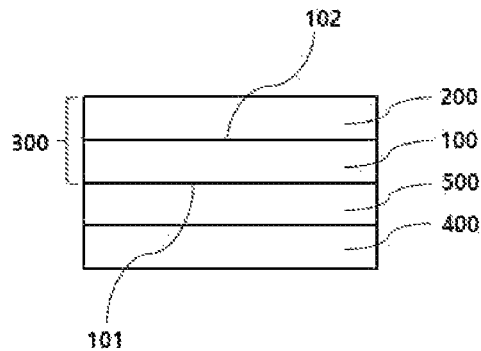
FIG. 1 is a cross-sectional view of a display device according to an embodiment.

Hereinafter, the embodiments will be described in detail with reference to the accompanying drawings so that those skilled in the art to which the present invention pertains may easily practice them. However, the embodiments may be implemented in many different ways and are not limited to those described herein.

Throughout the present specification, in the case where each film, window, panel, layer, or the like is mentioned to be formed "on" or "under" another film, window, panel, layer, or the like, it means not only that one element is directly formed on or under another element, but also that one element is indirectly formed on or under another element with other element(s) interposed between them. In addition, the term on or under with respect to each element may be referenced to the drawings. For the sake of description, the sizes of individual elements in the appended drawings may be exaggeratedly depicted and do not indicate the actual sizes. In addition, the same reference numerals refer to the same elements throughout the specification.

Throughout the present specification, when a part is referred to as "comprising" an element, it is understood that other elements may be comprised, rather than other elements are excluded, unless specifically stated otherwise.

In the present specification, a singular expression is interpreted to cover a singular or plural number that is interpreted in context unless otherwise specified.

In addition, all numbers and expressions related to the quantities of components, reaction conditions, and the like used herein are to be understood as being modified by the term "about," unless otherwise indicated.

The terms first, second, and the like are used herein to describe various elements, and the elements should not be limited by the terms. The terms are used only for the purpose of distinguishing one element from another.

In addition, the term "substituted" as used herein means to be substituted with at least one substituent group selected from the group consisting of deuterium, —F, —Cl, —Br, —I, a hydroxyl group, a cyano group, a nitro group, an amino group, an amidino group, a hydrazine group, a hydrazone group, an ester group, a ketone group, a carboxyl group, a substituted or unsubstituted alkyl group, a substituted or unsubstituted alkenyl group, a substituted or unsubstituted alkynyl group, a substituted or unsubstituted alkoxy group, a substituted or unsubstituted alicyclic organic group, a substituted or unsubstituted heterocyclic group, a substituted or unsubstituted aryl group, and a substituted or unsubstituted heteroaryl group. The substituent groups enumerated above may be connected to each other to form a ring.

A polyamide-based film that can be applied to a display material such as an organic light emitting diode and a liquid crystal display is required to have excellent optical, mechanical, and thermal characteristics, as well as an appropriate level of smooth texture in order not to give users a sense of difference in texture.

When the polyamide-based film is applied to a display device, a transparent cover window comprising a hard coating layer and a base film is employed in the display device. In such a case, there may be a problem in that in the process of forming the hard coating layer on the base film, the haze of the transparent cover window is increased, or defects may be generated due to insufficient adhesive strength. In particular, since the transparent cover window thus prepared causes a rainbow phenomenon in which iridescent stains are shown, which may give users eyestrain, it is necessary to improve this problem.

In addition, in the case of a composite film applied to a display device, which has a functional layer such as a hard coating layer, a high level of mechanical strength is required when it is applied to a flexible display, and a technology that does not cause curling at the edge of the film during the manufacturing process or use thereof is required. In such a case, it may be more effective, for example, for protecting the surface of the display device.

Accordingly, the polyamide-based composite film according to an embodiment significantly reduces the rainbow and stria phenomena, thereby having excellent display quality, and has enhanced mechanical properties in terms of excellent curling characteristics and high surface hardness. It also achieves a texture similar to that of glass, so that it does not give users a sense of difference in texture. It has been confirmed to be suitable for a transparent cover window and a display device comprising the same, whereby the embodiments have been completed.

Polyamide-Based Composite Film

The embodiments provide a polyamide-based composite film, which is excellent in mechanical properties and optical properties, as well as technically controls the color distortion phenomenon, thereby achieving an excellent reflective appearance. It also exhibits a texture similar to that of glass, whereby it does not give users a sense of difference in texture.

The polyamide-based composite film according to an embodiment comprises a base film comprising a polyamide-based polymer; and a functional layer disposed on the base film.

In an embodiment, the polyamide-based composite film has an in-plane retardation (Re) of 100 nm to 220 nm as measured with light having a wavelength of 550 nm.

Specifically, the in-plane retardation (Re) of the polyamide-based composite film may be 120 nm to 220 nm, 140 nm to 220 nm, 140 nm to 200 nm, 150 nm to 200 nm, or 150 nm to 195 nm, but it is not limited thereto.

Here, the in-plane retardation (Re) is a parameter defined by a product ($\Delta nxy \times d$) of anisotropy ($\Delta nxy = |nx-ny|$) of refractive indices of two mutually perpendicular axes on a film and the film thickness (d), which is a measure of the degree of optical isotropy and anisotropy.

If the polyamide-based composite film has an in-plane retardation within the above range, it is possible to control the wavelength dispersion, thereby significantly reducing the distortion caused by light, and it is possible to improve the rainbow phenomenon that causes iridescent stains, thereby reducing the eyestrain of users.

On the other hand, if the polyamide-based composite film has an in-plane retardation outside the above range, a rainbow phenomenon may appear when the polyamide-based composite film is applied to a retardation film or a film for a display device, and such a rainbow phenomenon may cause overlapping interference or the like on the screen to be displayed, thereby distorting colors or failing to implement a desired screen.

In an embodiment, the polyamide-based composite film has a refractive index of 1.48 to 1.54. Specifically, the refractive index of the polyamide-based composite film may be 1.49 to 1.54, 1.494 to 1.545, 1.494 to 1.540, 1.494 to 1.535, 1.494 to 1.530, 1.494 to 1.525, 1.494 to 1.520, 1.494 to 1.515, or 1.495 to 1.510, but it is not limited thereto.

If the polyamide-based composite film has a refractive index within the above range, its wavelength dispersion in the visible light region is excellent, whereby it is possible to reduce the stria phenomenon and the rainbow phenomenon.

According to an embodiment, the polyamide-based composite film has an Sa roughness (arithmetical mean height) of 0.005 μm to 0.08 μm in three-dimensional surface roughness parameters. Specifically, the Sa roughness of the polyamide-based composite film may be 0.006 μm to 0.08 μm, 0.008 μm to 0.08 μm, 0.008 μm to 0.07 μm, 0.008 μm to 0.06 μm, or 0.008 μm to 0.05 μm, but it is not limited thereto.

According to another embodiment, the polyamide-based composite film has an Sp roughness (maximum peak height) of 0.05 μm to 1.6 μm in three-dimensional surface roughness parameters. Specifically, the Sp roughness of the polyamide-based composite film may be 0.06 μm to 1.6 μm, 0.07 μm to 1.6 μm, 0.07 μm to 1.4 μm, 0.07 μm to 1.2 μm, 0.07 μm to 1.0 μm, or 0.07 μm to 0.85 μm, but it is not limited thereto.

According to still another embodiment, the polyamide-based composite film has an Sv roughness (maximum pit depth) of 0.04 μm to 1.5 μm in three-dimensional surface roughness parameters. Specifically, the Sv roughness of the polyamide-based composite film may be 0.05 μm to 1.5 μm, 0.05 µm to 1.2 µm, 0.05 µm to 1.0 µm, 0.07 µm to 1.0 µm, 0.1 µm to 1.0 µm, 0.15 µm to 1.0 µm, or 0.2 µm to 1.0 µm, but it is not limited thereto.

According to an embodiment, the polyamide-based composite film has an Sz roughness (maximum height) of 0.09 µm to 3.1 µm in three-dimensional surface roughness parameters. Specifically, the Sz roughness of the polyamide-based composite film may be 0.09 µm to 2.5 µm, 0.09 µm to 2.0 µm, 0.1 µm to 2.0 µm, 0.15 µm to 2.0 µm, 0.2 µm to 2.0 µm, 0.25 µm to 2.0 µm, 0.3 µm to 2.0 µm, or 0.3 µm to 1.7 µm, but it is not limited thereto.

The "roughness" refers to non-planarization of a surface, which is quantified by three-dimensional surface roughness parameters defined according to the ISO 25178 standard. The 3D surface roughness parameters are calculated based on the surface geometry determined by an optical measurement method.

After the polyamide-based composite film has been prepared, the Sa roughness, Sp roughness, Sv roughness, and Sz roughness of the polyamide-based composite film are measured as the three-dimensional surface roughnesses of one side of the functional layer positioned opposite to the side on which the base film is disposed.

If the polyamide-based composite film has three-dimensional surface roughnesses within the above ranges, it has a texture similar to that of glass. Thus, it does not give users a sense of difference in texture or aesthetic feeling, so that it can be advantageously used as a substitutive film for glass. Accordingly, the polyamide-based composite film is suitable for use as a substitute for glass. Since it is possible to secure lightweight and excellent folding characteristics as compared with glass, it is readily applicable to a foldable display device or a flexible display device.

In an embodiment, in the polyamide-based composite film, the surface hardness of one side of the functional layer positioned opposite to the side on which the base film is disposed is 4 H or higher or 5 H or higher, but it is not limited thereto.

If the surface hardness of the polyamide-based composite film satisfies the above range, it is resistant to scratches or strong impacts when applied to a display device; thus, the display device can be well protected.

In another embodiment, the polyamide-based composite film has a curl height of less than 15 mm.

Specifically, the curl height of the polyamide-based composite film may be 12 mm or less, 10 mm or less, 1 mm to less than 15 mm, 2 mm to less than 15 mm, 4 mm to less than 15 mm, 4 mm to 12 mm, or 4 mm to 10 mm, but it is not limited thereto.

The polyamide-based composite film is cut to a size of 10 cm×10 cm, it is placed on a glass plate such that the base film is in contact with the glass plate, and the height distanced from the 4 corners of the glass plate is measured at 25° C. and 50% RH. The curl height refers to an average value of the heights.

The polyamide-based composite film has a haze of 1% or less. For example, the haze may be 0.8% or less, 0.6% or less, 0.5% or less, 0.45% or less, or 0.43% or less, but it is not limited thereto.

The polyamide-based composite film has a transmittance of 80% or more. For example, the transmittance may be 82% or more, 85% or more, 88% or more, 89% or more, 90% or more, 91% or more, 90% to 99%, or 91% to 99%, but it is not limited thereto.

The polyamide-based composite film has a yellow index of 5 or less. For example, the yellow index may be 4 or less, 3.5 or less, or 3 or less, but it is not limited thereto.

If the haze, transmittance, and yellow index of the polyamide-based composite film are within the above ranges, it is colorless and transparent and has excellent optical properties; thus, it is suitable for use as a substitute film for glass as a cover window for a display.

Referring to FIG. 1, the polyamide-based composite film according to an embodiment comprises a base film (100) and a functional layer (200) disposed on the base film (100).

The base film (100) may be a support layer that supports the functional layer (200). In addition, the base film (100) may comprise a polyamide-based resin. For example, the base film (100) may be a polyamide-based film.

The functional layer (200) may be formed as a coating on the base film (100). The functional layer (200) may be laminated on the base film (100). The functional layer (200) may be bonded to the base film (100).

The functional layer (200) may be a coating layer coated on the base film (100). The functional layer (200) may comprise a curable resin. Specifically, the functional layer (200) may be a curable coating layer.

The functional layer (200) may function to enhance the mechanical properties and/or optical properties of the base film (100). It can be applied in various ways depending on the purpose. For example, the functional layer may comprise an antireflection layer, an antifouling layer, a hard coating layer, a restoration layer, an impact diffusion layer, an impact absorption layer, an anti-fingerprint layer, a self-cleaning layer, or a scratch-resistant layer.

As shown in FIG. 1, the functional layer (200) comprises a second side (102). The second side (102) is a side located on the side of the functional layer (200) on which the base film (100) is disposed. The second side (102) is a side located on the side of the functional layer (200) in contact with the base film (100). The second side (102) may be the lower side of the functional layer (200). For example, the second side (102) may be the bottom side of the functional layer (200).

The base film (100) comprises a first side (101). The first side (101) is a side opposite to the side of the base film (100) on which the functional layer (200) is disposed. The first side (101) is a side located opposite to the side of the base film (100) in contact with the functional layer (200). The first side (101) may be the lower side of the base film (100). For example, the first side (101) may be the bottom side of the base film (100).

The features on the structure, components, and properties of the polyamide-based composite film as described above may be combined with each other.

Base Film (100)

The base film (100) according to an embodiment comprises a polyamide-base polymer.

The base film (100) may further comprise a matting agent.

The matting agent may be at least one selected from the group consisting of silica, poly(methyl methacrylate) (PMMA), poly(butyl methacrylate) (PBMA), polystyrene (PS), melamine, silicone, barium sulfate, and glass.

The matting agent may have an average particle diameter of 10 nm to 1,000 nm. For example, the average particle diameter of the matting agent may be 50 nm to 800 nm, 50 nm to 500 nm, 50 nm to 300 nm, 50 nm to 200 nm, 70 nm to 180 nm, or 100 nm to 150 nm, but it is not limited thereto.

As the base film comprises the matting agent, it is possible to achieve a specific level of three-dimensional surface roughness, thereby achieving a texture similar to that of glass, as well as it is possible to enhance the winderability, thereby enhancing the effect of improving scratches caused by sliding in the preparation of the film. Further, as it reduces the reflection of the display, thereby increasing the visibility, it is possible to minimize the eyestrain of users.

The base film may comprise the matting agent in an amount of 100 to 3,000 ppm, or 200 to 1,000 ppm, based on the total weight of the polyamide-based polymer.

If the content of the matting agent contained in the film exceeds the above range, the matting agent precipitates on the surface of the film to make it unavailable for the subsequent process, or the haze of the film increases, resulting in a significant deterioration in the optical properties. In addition, if the content of the matting agent is less than the above range, the coatability may be poor due to a small surface area, which may be disadvantageous for the subsequent processes, and it may cause a deterioration in the durability (e.g., resistance to detachment) after the functional layer is formed on the base film.

If the average particle diameter and/or content of the matting agent satisfies the above range, a functional layer can be readily coated, and the compatibility of the base film and the functional layer in the finally manufactured film is enhanced, whereby it is possible to achieve a stable composite film.

According to an embodiment, the base film has a surface roughness (Ra) of 0.005 μm to 0.050 μm. Specifically, the surface roughness may be 0.007 μm to 0.050 μm or 0.007 μm to 0.030 μm, but it is not limited thereto.

As the surface roughness of the base film satisfies the above range, it is possible to obtain a film having a level of texture and aesthetic feeling similar to those of glass, and it reduces the reflection of the display, thereby producing the effect of enhanced visibility thereof.

According to another embodiment, the base film has a refractive index of 1.620 to 1.650. Specifically, the refractive index of the base film may be 1.630 to 1.650 or 1.630 to 1.640, but it is not limited thereto.

As the base film has a refractive index satisfying the above range, it is possible to minimize color distortion caused by overlapping interference on the screen and to achieve an excellent reflective appearance.

According to still another embodiment, the base film has a developed interfacial area ratio (Sdr) of 0.0005% to 0.0050%. Specifically, the developed interfacial area ratio (Sdr) of the base film may be 0.0005% to 0.0040%, 0.0005% to 0.0030%, or 0.0005% to 0.0020%, but it is not limited thereto.

Specifically, as the base film has a developed interfacial area ratio satisfying the above range, it can function as a base film suitable for the application to a composite film having excellent durability.

The base film according to an embodiment comprises a polyamide-based polymer, and the polyamide-based polymer is a polymer that contains an amide repeat unit. In addition, the polymer contained in the film may optionally comprise an imide repeat unit.

The base film comprises a polyamide-based polymer, and the polyamide-based polymer may be prepared by simultaneously or sequentially reacting reactants that comprise a diamine compound and a dicarbonyl compound. Specifically, the polyamide-based polymer is prepared by polymerizing a diamine compound and a dicarbonyl compound.

Alternatively, the polyamide-based polymer is prepared by polymerizing a diamine compound, a dianhydride compound, and a dicarbonyl compound. Here, the polyamide-based polymer comprises an imide repeat unit derived from the polymerization of the diamine compound and the dianhydride compound and an amide repeat unit derived from the polymerization of the diamine compound and the dicarbonyl compound.

The base film according to an embodiment comprises a polyamide-based polymer formed by polymerizing a diamine compound, a dicarbonyl compound, and optionally a dianhydride compound.

As an embodiment, the molar ratio of the dianhydride compound and the dicarbonyl compound is 0:100 to 50:50, 0:100 to 45:55, 0:100 to 30:70, 0:100 to 25:75, 0:100 to 20:80, 0:100 to 15:85, or 0:100 to 10:90.

If the molar ratio of the dianhydride compound and the dicarbonyl compound is within the above range, it is possible to obtain a film that significantly reduces the rainbow phenomenon, exhibits texture characteristics similar to those of glass, and has excellent folding characteristics.

As another embodiment, the dianhydride compound may be composed of zero, one, or two types, and the dicarbonyl compound may be composed of one or two types.

The diamine compound is a compound that forms an imide bond with the dianhydride compound and forms an amide bond with the dicarbonyl compound, to thereby form a copolymer.

The diamine compound is not particularly limited, but it may be, for example, an aromatic diamine compound that contains an aromatic structure. For example, the diamine compound may be a compound represented by the following Formula 1.

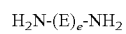

$$H_2N\text{-}(E)_e\text{-}NH_2 \qquad \text{[Formula 1]}$$

In Formula 1, E may be selected from a substituted or unsubstituted divalent $C_6$-$C_{30}$ aliphatic cyclic group, a substituted or unsubstituted divalent $C_4$-$C_{30}$ heteroaliphatic cyclic group, a substituted or unsubstituted divalent $C_6$-$C_{30}$ aromatic cyclic group, a substituted or unsubstituted divalent $C_4$-$C_{30}$ heteroaromatic cyclic group, a substituted or unsubstituted $C_1$-$C_{30}$ alkylene group, a substituted or unsubstituted $C_2$-$C_{30}$ alkenylene group, a substituted or unsubstituted $C_2$-$C_{30}$ alkynylene group, —O—, —S—, —C(=O)—, —CH(OH)—, —S(=O)$_2$—, —Si(CH$_3$)$_2$—, —C(CH$_3$)$_2$—, and —C(CF$_3$)$_2$—.

e is selected from integers of 1 to 5. When e is 2 or more, the Es may be the same as, or different from, each other.

(E)$_e$ in Formula 1 may be selected from the groups represented by the following Formulae 1-1a to 1-14a, but it is not limited thereto.

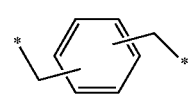

1-1a

1-2a

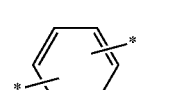

1-3a

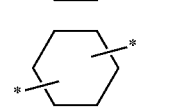

1-4a

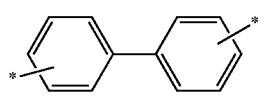
1-5a
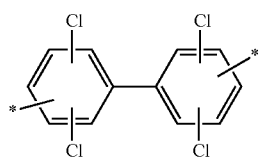
1-6a
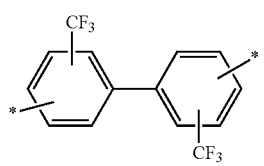
1-7a
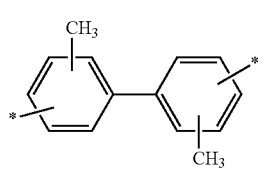
1-8a
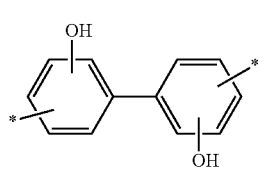
1-9a
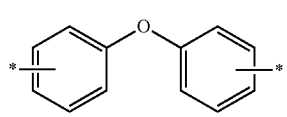
1-10a
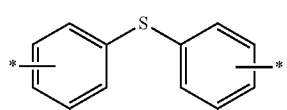
1-11a
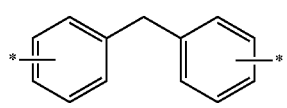
1-12a
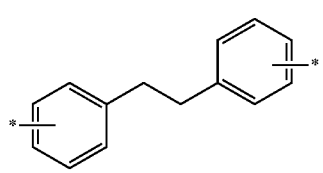
1-13a
*—$(CH_2)_n$—*
(n is selected from integers of 1 to 12)
1-14a
Specifically, $(E)_e$ in Formula 1 may be selected from the groups represented by the following Formulae 1-1b to 1-13b, but it is not limited thereto.
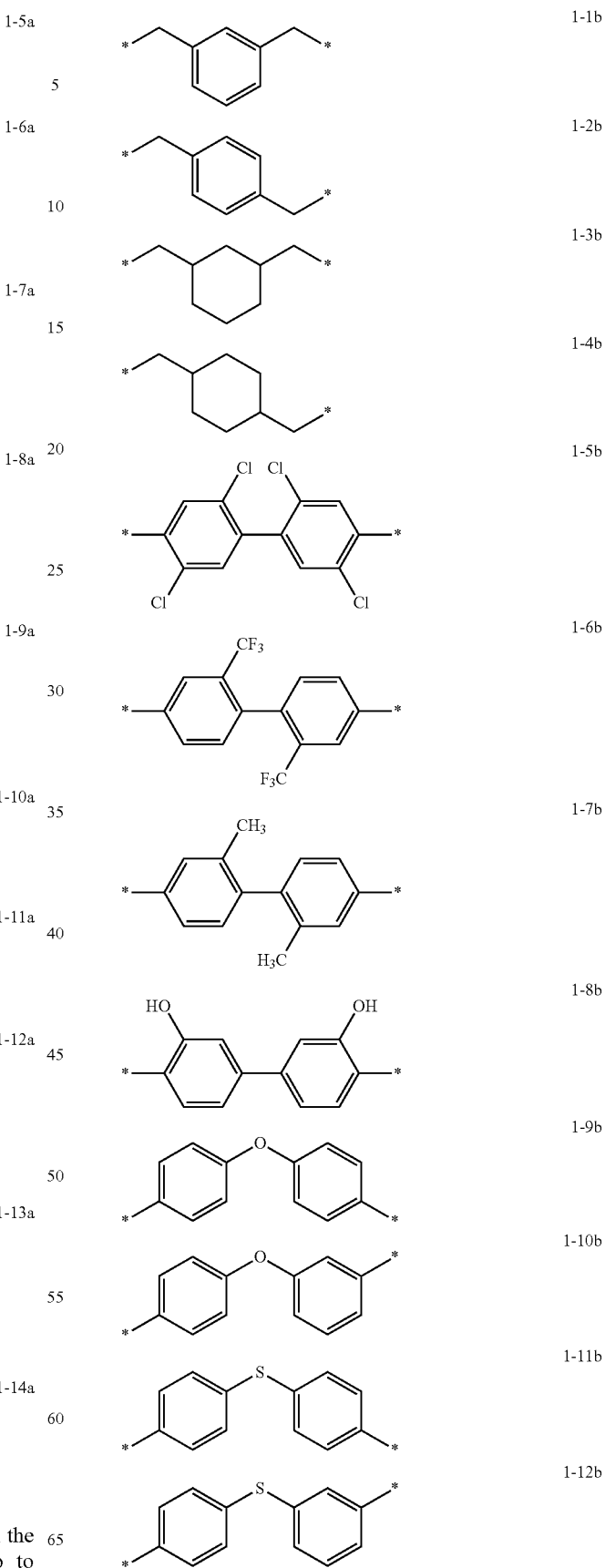

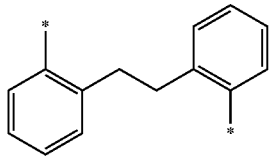

1-13b

More specifically, $(E)_e$ in Formula 1 may be the group represented by the above Formula 1-6b or the group represented by the above Formula 1-9b.

In an embodiment, the diamine compound may comprise a compound having a fluorine-containing substituent or a compound having an ether group (—O—).

The diamine compound may be composed of a compound having a fluorine-containing substituent. In such an event, the fluorine-containing substituent may be a fluorinated hydrocarbon group and specifically may be a trifluoromethyl group. But it is not limited thereto.

In another embodiment, one kind of diamine compound may be used as the diamine compound. That is, the diamine compound may be composed of a single component.

For example, the diamine compound may comprise 2,2'-bis(trifluoromethyl)-4,4'-diaminobiphenyl (TFDB) represented by the following formula, but it is not limited thereto.

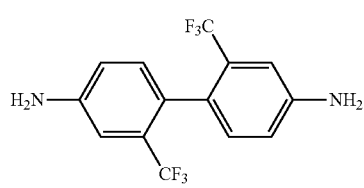

TFDB

The dianhydride compound has a low birefringence value, so that it can contribute to enhancements in the optical properties such as transmittance of a film that comprises the polyimide-based polymer. The polyimide-based polymer refers to a polymer that contains an imide repeat unit.

The dianhydride compound is not particularly limited, but it may be, for example, an aromatic dianhydride compound that contains an aromatic structure. For example, the aromatic dianhydride compound may be a compound represented by the following Formula 2.

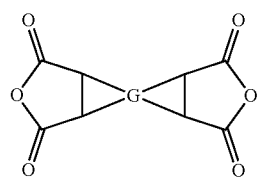

[Formula 2]

In Formula 2, G may be a group selected from a substituted or unsubstituted tetravalent $C_6$-$C_{30}$ aliphatic cyclic group, a substituted or unsubstituted tetravalent $C_4$-$C_{30}$ heteroaliphatic cyclic group, a substituted or unsubstituted tetravalent $C_6$-$C_{30}$ aromatic cyclic group, or a substituted or unsubstituted tetravalent $C_4$-$C_{30}$ heteroaromatic cyclic group, wherein the aliphatic cyclic group, the heteroaliphatic cyclic group, the aromatic cyclic group, or the heteroaromatic cyclic group may be present alone, may be fused to each other to form a condensed ring, or may be bonded by a bonding group selected from a substituted or unsubstituted $C_1$-$C_{30}$ alkylene group, a substituted or unsubstituted $C_2$-$C_{30}$ alkenylene group, a substituted or unsubstituted $C_2$-$C_{30}$ alkynylene group, —O—, —S—, —C(=O)—, —CH(OH)—, —Si(CH$_3$)$_2$—, —C(CH$_3$)$_2$—, and —C(CF$_3$)$_2$—.

G in the above Formula 2 may be selected from the groups represented by the following Formulae 2-1a to 2-9a, but it is not limited thereto.

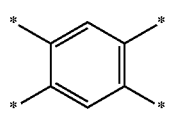

2-1a

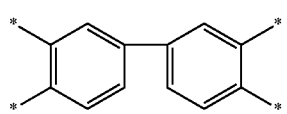

2-2a

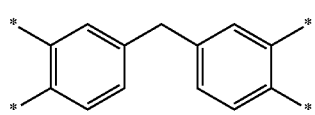

2-3a

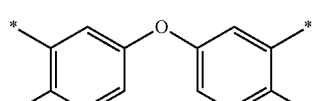

2-4a

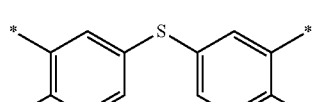

2-5a

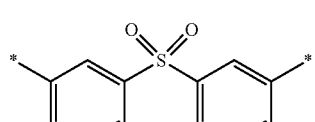

2-6a

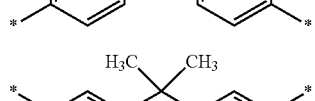

2-7

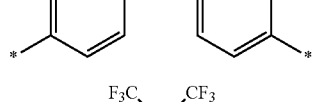

2-8a

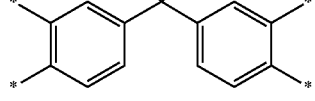

2-9a

For example, G in Formula 2 may be the group represented by the above Formula 2-2a, the group represented by the above Formula 2-8a, or the group represented by the above Formula 2-9a.

In an embodiment, the dianhydride compound may comprise a compound having a fluorine-containing substituent, a compound having a biphenyl group, or a compound having a ketone group.

The dianhydride compound may be composed of a compound having a fluorine-containing substituent. In such an event, the fluorine-containing substituent may be a fluorinated hydrocarbon group and specifically may be a trifluoromethyl group. But it is not limited thereto.

In another embodiment, the dianhydride compound may be composed of a single component or a mixture of two components.

For example, the dianhydride compound may comprise 2,2′-bis-(3,4-dicarboxyphenyl)hexafluoropropane dianhydride (6-FDA) represented by the following formula, but it is not limited thereto.

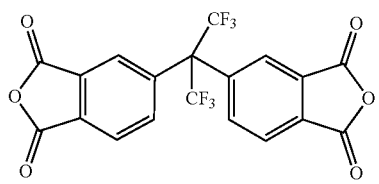

6-FDA

The diamine compound and the dianhydride compound may be polymerized to form a polyamic acid.

Subsequently, the polyamic acid may be converted to a polyimide through a dehydration reaction, and the polyimide comprises an imide repeat unit.

The polyimide may form a repeat unit represented by the following Formula A.

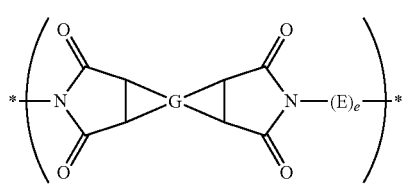

[Formula A]

In Formula A, E, G, and e are as described above.

For example, the polyimide may comprise a repeat unit represented by the following Formula A-1, but it is not limited thereto.

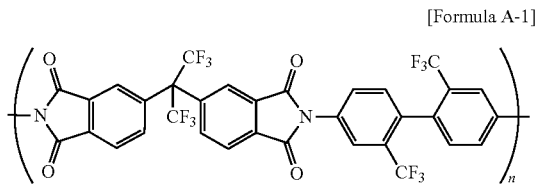

[Formula A-1]

In Formula A-1, n is an integer of 1 to 400.

The dicarbonyl compound is not particularly limited, but it may be, for example, a compound represented by the following Formula 3.

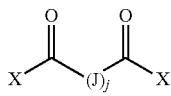

[Formula 3]

In Formula 3, J may be selected from a substituted or unsubstituted divalent $C_6$-$C_{30}$ aliphatic cyclic group, a substituted or unsubstituted divalent $C_4$-$C_{30}$ heteroaliphatic cyclic group, a substituted or unsubstituted divalent $C_6$-$C_{30}$ aromatic cyclic group, a substituted or unsubstituted divalent $C_4$-$C_{30}$ heteroaromatic cyclic group, a substituted or unsubstituted $C_1$-$C_{30}$ alkylene group, a substituted or unsubstituted $C_2$-$C_{30}$ alkenylene group, a substituted or unsubstituted $C_2$-$C_{30}$ alkynylene group, —O—, —S—, —C(=O)—, —CH(OH)—, —S(=O)$_2$—, —Si(CH$_3$)$_2$—, —C(CH$_3$)$_2$—, and —C(CF$_3$)$_2$—.

j is selected from integers of 1 to 5. When j is 2 or more, the Js may be the same as, or different from, each other.

X is a halogen atom. Specifically, X may be F, Cl, Br, I, or the like. More specifically, X may be Cl, but it is not limited thereto.

(J)$_j$ in the above Formula 3 may be selected from the groups represented by the following Formulae 3-1a to 3-14a, but it is not limited thereto.

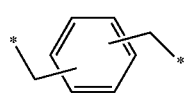

3-1a

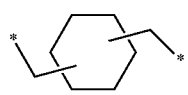

3-2a

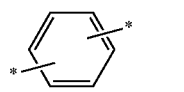

3-3a

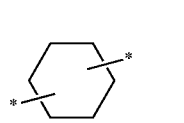

3-4a

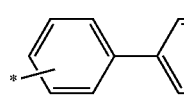

3-5a

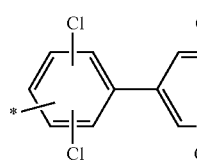

3-6a

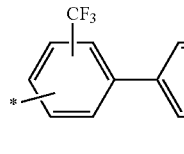

3-7a

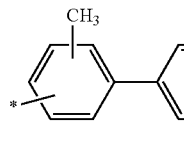

3-8a

-continued

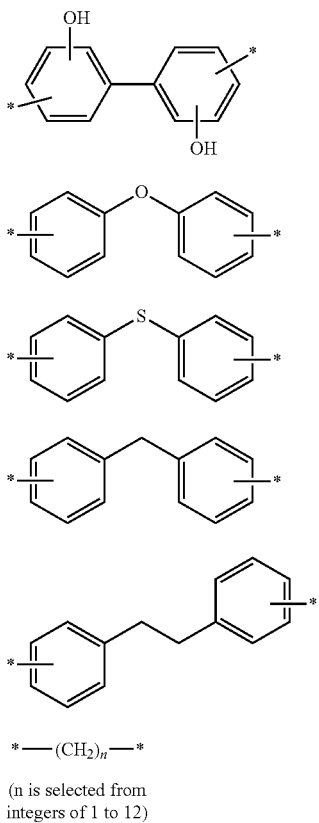

*―(CH₂)ₙ―*

(n is selected from integers of 1 to 12)

Specifically, (J)ⱼ in the above Formula 3 may be selected from the groups represented by the following Formulae 3-1b to 3-8b, but it is not limited thereto.

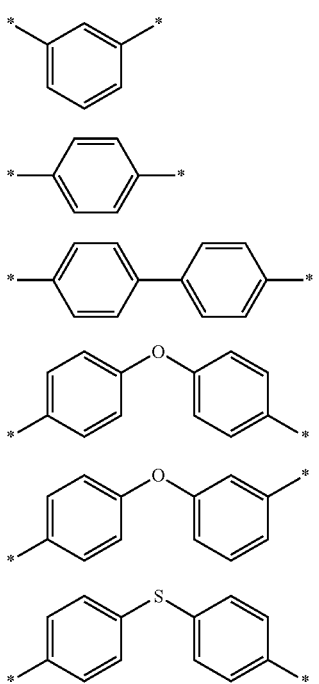

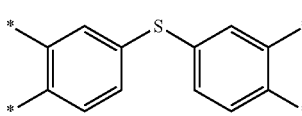

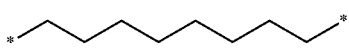

More specifically, (J)ⱼ in Formula 3 may be the group represented by the above Formula 3-1b, the group represented by the above Formula 3-2b, the group represented by the above Formula 3-3b, or the group represented by the above Formula 3-8b.

In an embodiment, a mixture of at least two kinds of dicarbonyl compounds different from each other may be used as the dicarbonyl compound. If two or more dicarbonyl compounds are used, at least two dicarbonyl compounds in which (J)ⱼ in the above Formula 3 is selected from the groups represented by the above Formulae 3-1b to 3-8b may be used as the dicarbonyl compound.

In another embodiment, the dicarbonyl compound may be an aromatic dicarbonyl compound that contains an aromatic structure.

For example, the dicarbonyl compound may comprise a first dicarbonyl compound and/or a second dicarbonyl compound.

The first dicarbonyl compound and the second dicarbonyl compound may be an aromatic dicarbonyl compound, respectively.

The first dicarbonyl compound and the second dicarbonyl compound may be compounds different from each other.

For example, the first dicarbonyl compound and the second dicarbonyl compound may be aromatic dicarbonyl compounds different from each other, but they are not limited thereto.

If the first dicarbonyl compound and the second dicarbonyl compound are an aromatic dicarbonyl compound, respectively, they comprise a benzene ring. Thus, they can contribute to improvements in the mechanical properties such as surface hardness and tensile strength of a film that comprises the polyamide-based polymer thus produced.

The dicarbonyl compound may comprise terephthaloyl chloride (TPC), 1,1'-biphenyl-4,4'-dicarbonyl dichloride (BPDC), isophthaloyl chloride (IPC), as represented by the following formulae, or a combination thereof. But it is not limited thereto.

TPC
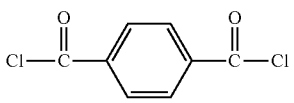

BPDC
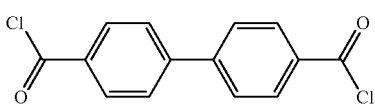

IPC
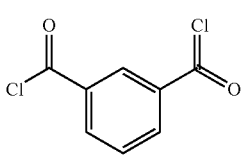

For example, the first dicarbonyl compound may comprise BPDC, and the second dicarbonyl compound may comprise TPC, but they are not limited thereto.

Specifically, if BPDC is used as the first dicarbonyl compound and TPC is used as the second dicarbonyl compound in a proper combination, a film that comprises the polyamide-based resin thus produced may have high oxidation resistance.

Alternatively, the first dicarbonyl compound may comprise IPC, and the second dicarbonyl compound may comprise TPC, but they are not limited thereto.

If IPC is used as the first dicarbonyl compound and TPC is used as the second dicarbonyl compound in a proper combination, a film that comprises the polyamide-based resin thus produced may not only have high oxidation resistance, but is also economical since the costs can be reduced.

The diamine compound and the dicarbonyl compound may be polymerized to form a repeat unit represented by the following Formula B.

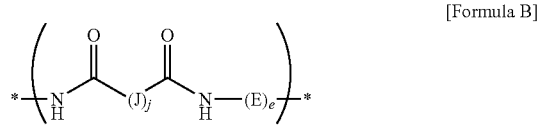

[Formula B]

In Formula B, E, J, e, and j are as described above.

For example, the diamine compound and the dicarbonyl compound may be polymerized to form amide repeat units represented by the following Formulae B-1 and B-2.

Alternatively, the diamine compound and the dicarbonyl compound may be polymerized to form amide repeat units represented by the following Formulae B-2 and B-3.

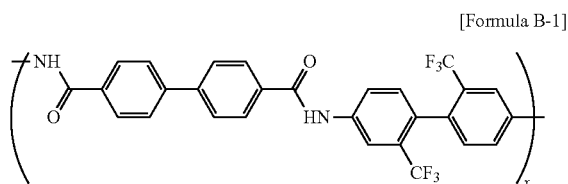

[Formula B-1]

In Formula B-1, $x$ is an integer of 1 to 400.

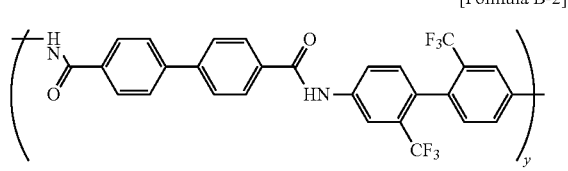

[Formula B-2]

In Formula B-2, $x$ is an integer of 1 to 400.

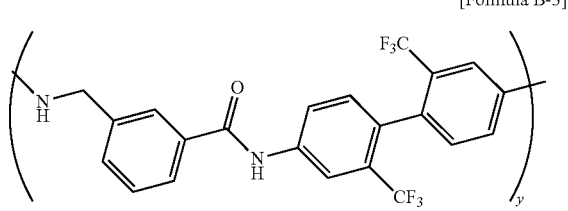

[Formula B-3]

In Formula B-3, $y$ is an integer of 1 to 400.

According to an embodiment, the polyamide-based polymer may comprise a repeat unit represented by the following Formula A and a repeat unit represented by the following Formula B:

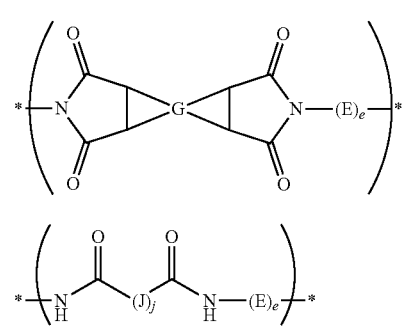

[Formula A]

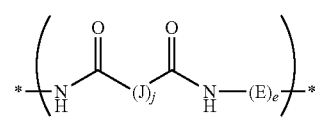

[Formula B]

In Formulae A and B, E and J are each independently selected from a substituted or unsubstituted divalent $C_6$-$C_{30}$ aliphatic cyclic group, a substituted or unsubstituted divalent $C_4$-$C_{30}$ heteroaliphatic cyclic group, a substituted or unsubstituted divalent $C_6$-$C_{30}$ aromatic cyclic group, a substituted or unsubstituted divalent $C_4$-$C_{30}$ heteroaromatic cyclic group, a substituted or unsubstituted $C_1$-$C_{30}$ alkylene group, a substituted or unsubstituted $C_2$-$C_{30}$ alkenylene group, a substituted or unsubstituted $C_2$-$C_{30}$ alkynylene group, —O—, —S—, —C(=O)—, —CH(OH)—, —S(=O)$_2$—, —Si(CH$_3$)$_2$—, —C(CH$_3$)$_2$—, and —C(CF$_3$)$_2$—, e and j are each independently selected from integers of 1 to 5, when e is 2 or more, then the two or more Es are the same as, or different from, each other, when j is 2 or more, then the two or more Js are the same as, or different from, each other, G is a substituted or unsubstituted tetravalent $C_6$-$C_{30}$ aliphatic cyclic group, a substituted or unsubstituted tetravalent $C_4$-$C_{30}$ heteroaliphatic cyclic group, a substituted or unsubstituted tetravalent $C_6$-$C_{30}$ aromatic cyclic group, or a substituted or unsubstituted tetravalent $C_4$-$C_{30}$ heteroaromatic cyclic group, wherein the aliphatic cyclic group, the heteroaliphatic cyclic group, the aromatic cyclic group, or the heteroaromatic cyclic group is present alone, fused to each other to form a condensed ring, or bonded by a bonding group selected from a substituted or unsubstituted $C_1$-$C_{30}$ alkylene group, a substituted or unsubstituted $C_2$-$C_{30}$ alkenylene group, a substituted or unsubstituted $C_2$-$C_{30}$ alkynylene group, —O—, —S—, —C(=O)—, —CH(OH)—, —S(=O)$_2$—, —Si(CH$_3$)$_2$—, —C(CH$_3$)$_2$—, and —C(CF$_3$)$_2$—.

In the polyamide-base polymer, the molar ratio of the repeat unit represented by the above Formula A to the repeat unit represented by the above Formula B may be 0:100 to 50:50, 0:100 to 45:55, 0:100 to 30:70, 0:100 to 25:75, 0:100 to 20:80, 0:100 to 15:85, or 0:100 to 10:90, but it is not limited thereto.

If the molar ratio of the repeat unit represented by Formula A and the repeat unit represented by Formula B is within the above range, it is possible to obtain a film that significantly reduces the rainbow phenomenon, thereby being effective in preventing reflection in the visible light region, exhibits texture characteristics similar to those of glass, and has excellent folding characteristics.

The content of residual solvents in the base film is 1,500 ppm or less. For example, the content of residual solvents may be 1,200 ppm or less, 1,000 ppm or less, 800 ppm or less, or 500 ppm or less, but it is not limited thereto.

The residual solvent refers to a solvent that has not been volatilized during the film production and remains in the film finally produced.

If the content of residual solvents in the base film exceeds the above range, the durability of the film may be deteriorated, and it may have an impact on the optical properties.

In addition, the base film has an IS value represented by the following Equation 1 of 10 to 200.

$$IS = IM + \frac{RS}{10}$$ [Equation 1]

In Equation 1, IM stands for the number of moles of the imide repeat unit when the total number of moles of the imide repeat unit and the amide repeat unit in the film is 100; and RS stands for the content (ppm) of the residual solvent in the film.

For example, the IS value may be 10 to 150, 10 to 120, or 10 to 60, but it is not limited thereto.

If the IS value of the base film satisfies the above range, it is possible to obtain a film that has excellent durability under severe conditions, is excellent in folding characteristics, and has a level of texture similar to that of glass.

When the base film according to an embodiment based on a thickness of 50 μm is folded to have a radius of curvature of 3 mm, the number of folding before the fracture is 200,000 or more.

The number of folding counts one when the film is folded to have a radius of curvature of 3 mm and then unfolded.

As the number of folding of the base film satisfies the above range, it can be advantageously applied to a foldable display device or a flexible display device.

The base film has a haze of 1% or less. For example, the haze may be 0.8% or less, 0.6% or less, 0.5% or less, or 0.4% or less, but it is not limited thereto.

The base film has a transmittance of 80% or more. For example, the transmittance may be 82% or more, 85% or more, 88% or more, 89% or more, 80% to 99%, 88% to 99%, or 89% to 99%, but it is not limited thereto.

The base film has a yellow index of 5 or less. For example, the yellow index may be 4 or less, 3.5 or less, or 3 or less, but it is not limited thereto.

The base film has a modulus of 5.0 GPa or more. Specifically, the modulus may be 5.5 GPa or more, 6.0 GPa or more, 6.5 GPa or more, or 7.0 GPa or more, but it is not limited thereto.

The base film has a compressive strength of 0.4 kgf/μm or more. Specifically, the compressive strength may be 0.45 kgf/μm or more, or 0.46 kgf/μm or more, but it is not limited thereto.

When the base film is perforated at a speed of 10 mm/minute using a 2.5-mm spherical tip in a UTM compression mode, the maximum diameter (mm) of perforation including a crack is 60 mm or less. Specifically, the maximum diameter of perforation may be 5 to 60 mm, 10 to 60 mm, 15 to 60 mm, 20 to 60 mm, 25 to 60 mm, or 25 to 58 mm, but it is not limited thereto.

The base film has a surface hardness of HB or higher. Specifically, the surface hardness may be H or higher, or 2 H or higher, but it is not limited thereto.

The base film has a tensile strength of 15 kgf/mm$^2$ or more. Specifically, the tensile strength may be 18 kgf/mm$^2$ or more, 20 kgf/mm$^2$ or more, 21 kgf/mm$^2$ or more, or 22 kgf/mm$^2$ or more, but it is not limited thereto.

The base film has an elongation of 15% or more. Specifically, the elongation may be 16% or more, 17% or more, or 17.5% or more, but it is not limited thereto.

The base film according to an embodiment has excellent optical properties in terms of low haze, low yellow index, and high transmittance, as well as texture characteristics similar to those of glass, and may secure excellent folding characteristics. As a result, it produces the effect of enhancing the aesthetic feeling and visibility of a display.

The physical properties of the base film as described above are based on a thickness of 40 μm to 60 μm. For example, the physical properties of the base film are based on a thickness of 50 μm.

The features on the components and properties of the base film as described above may be combined with each other.

In addition, the properties of the base film as described above are the results materialized by combinations of the chemical and physical properties of the components, which constitute the base film, along with the conditions in each step of the process for preparing the base film as described below.

For example, the compositions and contents of the components that constitute the base film, the types and contents of additives, the range of surface roughness, the thermal treatment and cooling temperature conditions in the film preparation process, and the like are all combined to achieve the desired level of in-plane retardation.

Process for Preparing a Base Film (100)

An embodiment provides a process for preparing a base film.

The process for preparing a base film according to an embodiment comprises preparing a polyamide-based polymer solution in an organic solvent; transferring the polymer solution to a tank; casting the polymer solution in the tank onto a belt and then drying it to prepare a gel-sheet; thermally treating the gel-sheet while it is moved to prepare a cured film; and cooling the cured film while it is moved.

Figure 2:
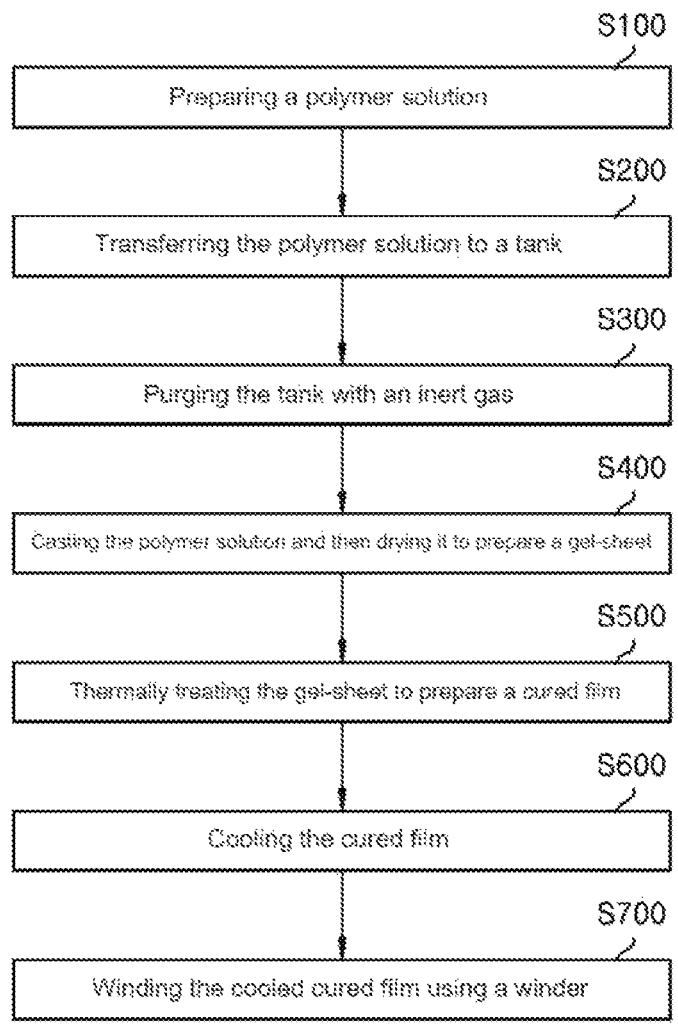
FIG. 2 is a schematic flow diagram of a process for preparing a base film according to an embodiment.

Referring to FIG. 2, the process for preparing a base film comprises simultaneously or sequentially mixing a diamine compound and a dicarbonyl compound, or a diamine compound, a dianhydride compound, and a dicarbonyl compound, in an organic solvent in a polymerization apparatus, and reacting the mixture to prepare a polymer solution (S100); charging the polymer solution to a tank (S200); purging with an inert gas (S300); casting the polymer solution in the tank onto a belt and then drying it to prepare a gel-sheet (S400); thermally treating the gel-sheet while it is moved to prepare a cured film (S500); cooling the cured film while it is moved (S600); and winding the cooled cured film using a winder (S700).

The base film is a film that comprises a polyamide-based resin as a main component. The polyamide-based resin is a resin that comprises an amide repeat unit as a structural unit. In addition, the polyamide-based film may comprise an imide repeat unit as well.

In the process for preparing a base film, a polymer solution for preparing the polyamide-based resin is prepared by simultaneously or sequentially mixing a diamine compound and a dicarbonyl compound, or a diamine compound, a dianhydride compound, and a dicarbonyl compound, in an organic solvent in a polymerization apparatus, and reacting the mixture (S100).

In an embodiment, the polymer solution may be prepared by simultaneously mixing and reacting a diamine compound and a dicarbonyl compound, or a diamine compound, a dianhydride compound, and a dicarbonyl compound, in an organic solvent.

In another embodiment, the step of preparing the polymer solution may comprise mixing and reacting the diamine compound and the dicarbonyl compound in a solvent to produce a polyamide (PA) solution. The polyamide solution is a solution that comprises a polymer having an amide repeat unit.

In still another embodiment, the step of preparing the polymer solution may comprise first mixing and reacting the diamine compound and the dianhydride compound in a solvent to produce a polyamic acid (PAA) solution; and second mixing and reacting the polyamic acid (PAA) solution and the dicarbonyl compound to form an amide bond and an imide bond. The polyamic acid solution is a solution that comprises a polyamic acid.

Alternatively, the step of preparing the polymer solution may comprise first mixing and reacting the diamine compound and the dianhydride compound in a solvent to produce a polyamic acid solution; subjecting the polyamic acid solution to dehydration to produce a polyimide (PI) solution; and second mixing and reacting the polyimide (PI) solution and the dicarbonyl compound to further form an amide bond. The polyimide solution is a solution that comprises a polymer having an imide repeat unit.

In still another embodiment, the step of preparing the polymer solution may comprise first mixing and reacting the diamine compound and the dicarbonyl compound in a solvent to produce a polyamide (PA) solution; and second mixing and reacting the polyamide (PA) solution and the dianhydride compound to further form an imide bond. The polyamide solution is a solution that comprises a polymer having an amide repeat unit.

The polymer solution thus prepared may be a solution that comprises a polymer containing at least one selected from the group consisting of a polyamic acid (PAA) repeat unit, a polyamide (PA) repeat unit, and a polyimide (PI) repeat unit.

The polymer contained in the polymer solution comprises an amide repeat unit derived from the polymerization of the diamine compound and the dicarbonyl compound.

Alternatively, the polymer contained in the polymer solution comprises an imide repeat unit derived from the polymerization of the diamine compound and the dianhydride compound and an amide repeat unit derived from the polymerization of the diamine compound and the dicarbonyl compound.

The content of solids contained in the polymer solution may be 10% by weight to 30% by weight. Alternatively, the content of solids contained in the second polymer solution may be 15% by weight to 25% by weight, but it is not limited thereto.

If the content of solids contained in the polymer solution is within the above range, a base film can be effectively produced in the extrusion and casting steps. In addition, the base film thus produced may have mechanical properties in terms of an improved modulus and the like and optical properties in terms of a low yellow index and the like.

In an embodiment, the step of preparing the polymer solution may further comprise introducing a catalyst.

Here, the catalyst may comprise at least one selected from the group consisting of beta picoline, acetic anhydride, isoquinoline (IQ), and pyridine-based compounds, but it is not limited thereto.

The catalyst may be added in an amount of 0.01 to 0.4 molar equivalent based on 1 mole of the polyamic acid, but it is not limited thereto.

The further addition of the catalyst may expedite the reaction rate and enhance the chemical bonding force between the repeat unit structures or that within the repeat unit structures.

In another embodiment, the step of preparing the polymer solution may further comprise adjusting the viscosity of the polymer solution.

Specifically, the step of preparing the polymer solution may comprise (a) simultaneously or sequentially mixing and reacting a diamine compound and a dicarbonyl compound, or a diamine compound, a dianhydride compound, and a dicarbonyl compound, in an organic solvent to prepare a first polymer solution; (b) measuring the viscosity of the first polymer solution and evaluating whether the target viscosity has been reached; and (c) if the viscosity of the first polymer solution does not reach the target viscosity, further adding the dicarbonyl compound to prepare a second polymer solution having the target viscosity.

The target viscosity may be 100,000 cps to 500,000 cps at room temperature. Specifically, the target viscosity may be 100,000 cps to 400,000 cps, 100,000 cps to 350,000 cps, 100,000 cps to 300,000 cps, 150,000 cps to 300,000 cps, or 150,000 cps to 250,000 cps, but it is not limited thereto.

In the steps of preparing the first polymer solution and the second polymer solution, the polymer solutions have viscosities different from each other. For example, the second polymer solution has a viscosity higher than that of the first polymer solution.

In the steps of preparing the first polymer solution and the second polymer solution, the stirring speeds are different from each other. For example, the stirring speed when the first polymer solution is prepared is faster than the stirring speed when the second polymer solution is prepared.

In still another embodiment, the step of preparing the polymer solution may further comprise adjusting the pH of the polymer solution. In this step, the pH of the polymer solution may be adjusted to 4 to 7, for example, 4.5 to 7.

The pH of the polymer solution may be adjusted by adding a pH adjusting agent. The pH adjusting agent is not particularly limited and may include, for example, amine-based compounds such as alkoxyamine, alkylamine, and alkanolamine.

If the pH of the polymer solution is adjusted to the above range, it is possible to prevent damage to the equipment in the subsequent process, to prevent the generation of defects in the film produced from the polymer solution, and to achieve the desired optical properties and mechanical properties in terms of yellow index and modulus.

The pH adjusting agent may be employed in an amount of 0.1% by mole to 10% by mole based on the total number of moles of monomers in the polymer solution.

In another embodiment, the step of preparing the polymer solution may further comprise purging with an inert gas. The step of purging with an inert gas may remove moisture, reduce impurities, increase the reaction yield, and impart excellent surface appearance and mechanical properties to the film finally produced.

The inert gas may be at least one selected from the group consisting of nitrogen, helium (He), neon (Ne), argon (Ar), krypton (Kr), xenon (Xe), and radon (Rn), but it is not limited thereto. Specifically, the inert gas may be nitrogen.

In another embodiment, the process for preparing a base film may further comprise adding a matting agent.

The step of adding the matting agent may be carried out before preparing the polymer solution or may be carried out after preparing the polymer solution. That is, the matting agent is first dissolved in an organic solvent, and the mixture is then reacted to prepare the polymer. Alternatively, the mixture is first reacted in an organic solvent, and the matting agent is then added to the organic solvent.

Specifically, the process may comprise preparing a polyamide-based polymer solution and then adding a matting agent to the organic solvent.

As a result, it is possible to achieve a film that has a level of texture similar to that of glass. Further, it is possible to enhance the effect of improving scratches generated at the time of sliding during the film preparation process by enhancing the surface roughness and windability and to achieve an aesthetic feeling similar to that of glass. Further, it reduces strains caused by light interference due to light reflection, thereby producing the effect of enhancing the visibility of the display.

Details on the type and content of the matting agent are as described above.

The molar ratio of the dianhydride compound and the dicarbonyl compound used for the preparation of the polymer solution may be 0:100 to 50:50, 0:100 to 45:55, 0:100 to 30:70, 0:100 to 25:75, 0:100 to 20:80, 0:100 to 15:85, or 0:100 to 10:90. As the dianhydride compound and the dicarbonyl compound are employed at the above molar ratio, it is advantageous for achieving the desired levels of mechanical properties and optical properties of the base film prepared from the polymer solution.

If the above range is not satisfied, such mechanical properties as the number of folding and hardness or such optical properties as transparency may be deteriorated.

Details on the diamine compound, the dianhydride compound, and the dicarbonyl compound are as described above.

In an embodiment, the organic solvent may be at least one selected from the group consisting of dimethylformamide (DMF), dimethylacetamide (DMAc), N-methyl-2-pyrrolidone (NMP), m-cresol, tetrahydrofuran (THF), and chloroform. The organic solvent employed in the polymer solution may be dimethylacetamide (DMAc), but it is not limited thereto.

Next, after the step of preparing the polymer solution, the polymer solution is transferred to a tank (S200).

Figure 3:
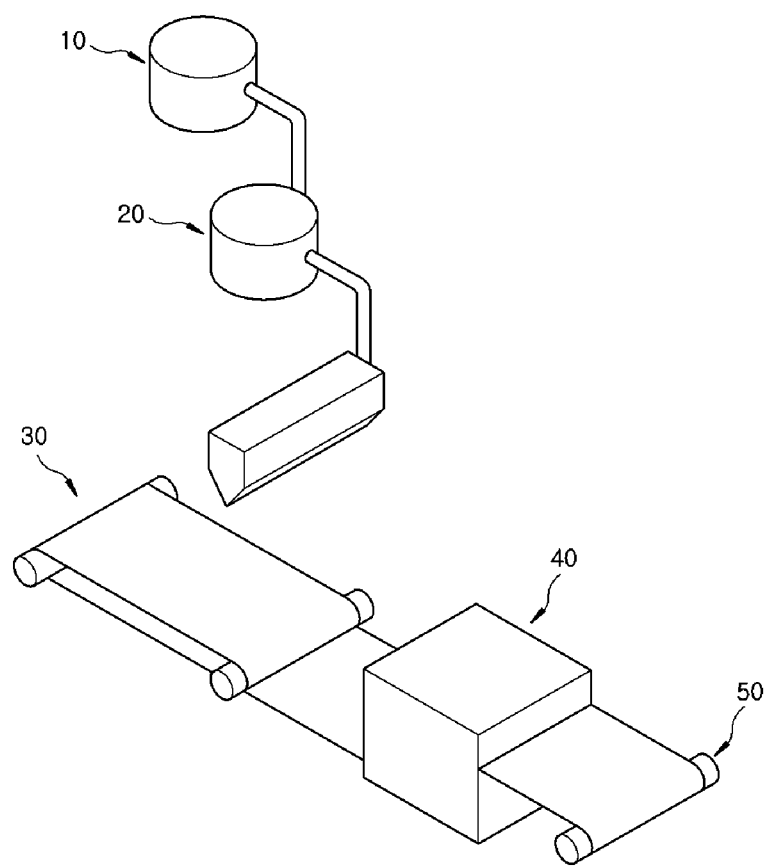
FIG. 3 schematically illustrates process facilities for preparing a base film according to an embodiment.

FIG. 3 schematically illustrates process facilities for preparing the base film according to an embodiment. Referring to FIG. 3, the polymer solution as described above is prepared in a polymerization apparatus (10), and the polymer solution thus produced is transferred to, and stored in, a tank (20).

Here, once the polymer solution has been prepared, the step of transferring the polymer solution to the tank is carried out without any additional steps. Specifically, the polymer solution prepared in the polymerization apparatus is transferred to, and stored in, the tank without any separate precipitation and redissolution steps for removing impurities. In the conventional process, in order to remove impurities such as hydrochloric acid (HCl) generated during the preparation of a polymer solution, the polymer solution thus prepared is purified through a separate step to remove the impurities, and the purified polymer solution is then redissolved in a solvent. In this case, however, there has been a problem that the loss of the active ingredient increases in the step of removing the impurities, resulting in decreases in the yield.

Accordingly, the preparation process according to an embodiment ultimately minimizes the amount of impurities generated in the step of preparing the polymer solution or properly controls the impurities in the subsequent steps, even if a certain amount of impurities is present, so as not to deteriorate the physical properties of the final film. Thus, the process has an advantage in that a film is produced without separate precipitation or redissolution steps.

The tank (20) is a place for storing the polymer solution before forming it into a film, and its internal temperature may be −20° C. to 20° C.

Specifically, the internal temperature may be −20° C. to 10° C., −20° C. to 5° C., −20° C. to 0° C., or 0° C. to 10° C., but it is not limited thereto.

If the internal temperature of the tank (20) is controlled to the above range, it is possible to prevent the polymer solution from deteriorating during storage, and it is possible to lower the moisture content to thereby prevent defects of the film produced therefrom.

The process for preparing a base film may further comprise carrying out vacuum degassing of the polymer solution transferred to the tank (20).

The vacuum degassing may be carried out for 30 minutes to 3 hours after depressurizing the internal pressure of the tank to 0.1 bar to 0.7 bar. The vacuum degassing under these conditions may reduce bubbles in the polymer solution. As a result, it is possible to prevent surface defects of the film produced therefrom and to achieve excellent optical properties such as haze.

In addition, the process for preparing a base film may further comprise purging the polymer solution transferred to the tank (20) with an inert gas (S300).

Specifically, the purging is carried out by purging the tank with an inert gas at an internal pressure of 1 atm to 2 atm. The nitrogen purging under these conditions may remove moisture in the polymer solution, reduce impurities to thereby increase the reaction yield, and achieve excellent optical properties such as haze and mechanical properties.

The inert gas may be at least one selected from the group consisting of nitrogen, helium (He), neon (Ne), argon (Ar), krypton (Kr), xenon (Xe), and radon (Rn), but it is not limited thereto. Specifically, the inert gas may be nitrogen.

The step of vacuum degassing and the step of purging the tank with an inert gas are performed in a separate step, respectively.

For example, the step of vacuum degassing may be carried out, followed by the step of purging the tank with an inert gas, but it is not limited thereto.

The step of vacuum degassing and/or the step of purging the tank with an inert gas may improve the physical properties of the surface of the base film thus produced.

Thereafter, the process may further comprise storing the polymer solution in the tank (20) for 1 hour to 360 hours. Here, the temperature inside the tank may be kept at −20° C. to 20° C.

The process for preparing a base film may further comprise casting the polymer solution in the tank and then drying it to prepare a gel-sheet (S400).

The polymer solution may be cast onto a casting body such as a casting roll or a casting belt.

Referring to FIG. 3, according to an embodiment, the polymer solution may be applied onto a casting belt (30) as a casting body, and it is dried while it is moved to be made into a sheet in the form of a gel.

When the polymer solution is injected onto the belt (30), the injection rate may be 300 g/minute to 700 g/minute. If the injection rate of the polymer solution satisfies the above range, the gel-sheet can be uniformly formed to an appropriate thickness.

In addition, the casting thickness of the polymer solution may be 200 μm to 700 μm. As the polymer solution is cast to a thickness within the above range, the final film produced after the drying and thermal treatment may have an appropriate and uniform thickness.

As described above, the viscosity of the polymer solution at room temperature may be 100,000 cps to 500,000 cps, for example, 100,000 cps to 400,000 cps, 100,000 cps to 350,000 cps, 150,000 cps to 350,000 cps, or 150,000 cps to 250,000 cps. If the viscosity satisfies the above range, the polymer solution can be cast onto a belt in a uniform thickness without defects.

The polymer solution is cast and then dried at a temperature of 60° C. to 150° C. for 5 minutes to 60 minutes to prepare a gel-sheet. The solvent of the polymer solution is partially or totally volatilized during the drying to prepare the gel-sheet.

The moving speed of the gel-sheet on the casting body at the time of drying may be 0.1 m/minute to 15 m/minute, for example, 0.5 m/minute to 10 m/minute, but it is not limited thereto.

The process for preparing a base film comprises thermally treating the gel-sheet while it is moved to prepare a cured film (S500).

Referring to FIG. 3, the thermal treatment of the gel-sheet can be carried out by passing it through a thermosetting device (40).

When the gel-sheet passes through the thermosetting device (40), it is treated with hot air.

If the thermal treatment is carried out with hot air, the heat may be uniformly supplied. If the heat is not uniformly supplied, a satisfactory surface roughness cannot be achieved, which may raise or lower the surface tension too much.

The thermal treatment of the gel-sheet is carried out in a temperature range of 60° C. to 500° C. for 5 minutes to 200 minutes. Specifically, the thermal treatment of the gel-sheet may be carried out in a temperature range of 75° C. to 460° C. at a temperature elevation rate of 1.5° C./minute to 80° C./minute for 10 minutes to 150 minutes.

In such an event, the initial temperature of the thermal treatment of the gel-sheet may be 60° C. or higher. Specifically, it may be 60° C. to 200° C., more specifically, 80° C. to 180° C.

In addition, the maximum temperature in the thermal treatment may be 300° C. to 500° C. For example, the maximum temperature in the thermal treatment may be 350° C. to 500° C., 380° C. to 500° C., 400° C. to 500° C., 410° C. to 480° C., 410° C. to 470° C., or 410° C. to 450° C.

That is, referring to FIG. 3, the inlet temperature of the thermosetting device (40) may be the initial temperature of the thermal treatment, and the temperature of a certain region inside the thermosetting device (40) may be the maximum temperature in the thermal treatment.

According to an embodiment, the thermal treatment of the gel-sheet may be carried out in two or more steps.

Specifically, the thermal treatment comprises a first hot air treatment step carried out for 5 minutes to 30 minutes in a range of 60° C. to 120° C.; and a second hot air treatment step carried out for 10 minutes to 120 minutes in a range of 120° C. to 350° C.

The thermal treatment under these conditions may cure the gel-sheet to have appropriate surface hardness and modulus and may secure high light transmittance, low haze, and an appropriate level of texture of the cured film at the same time.

According to another embodiment, the thermal treatment may comprise passing it through an IR heater. The thermal treatment by an IR heater may be carried out for 1 minute to 30 minutes in a temperature range of 300° C. or higher.

Specifically, the thermal treatment by an IR heater may be carried out for 1 minute to 20 minutes in a temperature range of 300° C. to 500° C.

The process for preparing a base film comprises cooling the cured film while it is moved (S600).

Referring to FIG. 3, the cooling of the cured film is carried out after it has been passed through the thermosetting device (40). It may be carried out by using a separate cooling chamber (not shown) or by forming an appropriate temperature atmosphere without a separate cooling chamber.

The step of cooling the cured film while it is moved may comprise a first temperature lowering step of reducing the temperature at a rate of 100° C./minute to 1,000° C./minute and a second temperature lowering step of reducing the temperature at a rate of 40° C./minute to 400° C./minute.

In such an event, specifically, the second temperature lowering step is performed after the first temperature lowering step. The temperature lowering rate of the first temperature lowering step may be faster than the temperature lowering rate of the second temperature lowering step.

For example, the maximum rate of the first temperature lowering step is faster than the maximum rate of the second temperature lowering step. Alternatively, the minimum rate of the first temperature lowering step is faster than the minimum rate of the second temperature lowering step.

If the step of cooling the cured film is carried out in such a multistage manner, it is possible to have the physical properties of the cured film further stabilized and to maintain the optical properties and mechanical properties of the film achieved during the curing step more stably for a long period of time.

The moving speed of the gel-sheet and the moving speed of the cured film are the same.

The process for preparing a base film comprises winding the cooled cured film using a winder (S700).

Referring to FIG. 3, the cooled cured film may be wound using a roll-shaped winder (50).

In such an event, the ratio of the moving speed of the gel-sheet on the belt at the time of drying to the moving speed of the cured film at the time of winding is 1:0.95 to 1:1.40. Specifically, the ratio of the moving speeds may be 1:0.99 to 1:1.20, 1:0.99 to 1:1.10, or 1:1.0 to 1:1.05, but it is not limited thereto.

If the ratio of the moving speeds is outside the above range, the mechanical properties of the cured film may be impaired, and the flexibility and elastic properties may be deteriorated.

In the process for preparing a base film, the thickness variation (%) according to the following Relationship 1 may be 3% to 30%. Specifically, the thickness variation (%) may be 5% to 20%, but it is not limited thereto.

$$\text{Thickness variation (\%)} = (M1 - M2)/M2 \times 100 \qquad \text{[Relationship 1]}$$

In Relationship 1, M1 is the thickness (µm) of the gel-sheet, and M2 is the thickness (µm) of the cooled cured film at the time of winding.

The base film prepared by the preparation process as described above is excellent in optical properties and mechanical properties. The base film may be applicable to various uses that require flexibility, transparency, and a certain level of texture. For example, the base film may be applied to solar cells, displays, semiconductor devices, sensors, and the like.

In particular, since the base film can significantly reduce the rainbow phenomenon and achieve texture characteristics similar to those of glass, it can be advantageously applied to a cover window for a display device and to a display device as a film with lightweight for substituting glass. Since it has excellent folding characteristics, it can be advantageously applied to a foldable display device or a flexible display device.

Details on the polyamide-based base film prepared by the above preparation process are as described above.

Functional Layer (200)

The functional layer (200) may comprise an organic resin. In addition, the functional layer (200) may further comprise a filler.

The functional layer (200) may further comprise other additives.

The organic resin may be a curable resin. The organic resin may be a binder resin. The organic resin may be at least one selected from the group consisting of an acrylate-based monomer, a urethane acrylate-based oligomer, and an epoxy acrylate-based oligomer.

The acrylate-based monomer may be at least one selected from the group consisting of a substituted or unsubstituted acrylate and a substituted or unsubstituted methacrylate.

The acrylate-based monomer may contain 1 to 10 functional groups. The urethane acrylate-based oligomer may contain 2 to 15 functional groups. The epoxy acrylate-based oligomer may contain 1 to 10 functional groups.

Examples of the acrylate-based monomers include trimethylolpropane triacrylate (TMPTA), trimethylolpropaneethoxy triacrylate (TMPEOTA), glycerin propoxylated triacrylate (GPTA), pentaerythritol tetraacrylate (PETA), and dipentaerythritol hexaacrylate (DPHA).

The acrylate-based monomer may have a weight average molecular weight (Mw) of about 200 to about 2,000 g/mole, about 200 to about 1,000 g/mole, or about 200 to about 500 g/mole.

The acrylate equivalent weight of the acrylate-based monomer may range from about 50 to about 300 g/eq., from about 50 to about 200 g/eq., or from about 50 to about 150 g/eq.

Examples of the urethane acrylate-based oligomer include a bifunctional urethane acrylate oligomer having a weight average molecular weight of 1,400 to 25,000, a trifunctional urethane acrylate oligomer having a weight average molecular weight of 1,700 to 16,000, a tetra-functional urethane acrylate oligomer having a weight average molecular weight of 500 to 3,500, a hexa-functional urethane acrylate oligomer having a weight average molecular weight of 818 to 2,600, an ennea-functional urethane acrylate oligomer having a weight average molecular weight of 3,500 to 5,500, a deca-functional urethane acrylate oligomer having a weight average molecular weight of 3,200 to 3,900, and a pentakai-deca-functional urethane acrylate oligomer having a weight average molecular weight of 2,300 to 20,000.

Examples of the epoxy acrylate-based oligomer include a monofunctional epoxy acrylate oligomer having a weight average molecular weight of 100 to 300, a bifunctional epoxy acrylate oligomer having a weight average molecular weight of 250 to 2,000, and a tetra-functional epoxy acrylate oligomer having a weight average molecular weight of 1,000 to 3,000.

The epoxy equivalent weight of the epoxy acrylate-based oligomer may range from about 50 to about 300 g/eq, from about 50 to about 200 g/eq, or from about 50 to about 150 g/eq.

The content of the organic resin may be 30% by weight to 100% by weight based on the total weight of the functional layer. Specifically, the content of the organic resin may be 40% by weight to 90% by weight, 50% by weight to 90% by weight, or 50% by weight to 80% by weight, based on the total weight of the functional layer.

Examples of the filler include silica, barium sulfate, zinc oxide, and alumina.

The content of the filler may be 40,000 to 300,000 ppm based on the total weight of the functional layer. Specifically, the content of the filler may be 40,000 to 250,000 ppm, 50,000 to 250,000 ppm, 50,000 to 240,000 ppm, or 70,000 to 240,000 ppm, based on the total weight of the functional layer, but it is not limited thereto.

The filler may have a particle diameter of 5 nm to 100 nm. Specifically, the particle diameter of the filler may be 5 nm to 80 nm, 5 nm to 60 nm, 5 nm to 50 nm, 5 nm to 30 nm, 5 nm to 20 nm, or 10 nm to 15 nm.

The filler may be subjected to surface treatment. The filler may be subjected to surface treatment with a silane coupling agent or the like. Examples of the silane coupling agent include (meth)acrylsilane, methacroxysilane, vinylsilane, epoxysilane, and mercaptosilane.

Specifically, the filler may be a silica-based material, and the particle diameter thereof may be 5 nm to 100 nm, for example, 10 nm to 15 nm, but it is not limited thereto.

When the functional layer comprises the filler, it is possible to not only enhance the surface hardness of the polyamide-based composite film, but also affect the surface roughness and light path, thereby reducing the rainbow phenomenon and achieving an appropriate surface texture.

In an embodiment, in the polyamide-based composite film, the base film may further comprise a matting agent, and the functional layer may further comprise a filler.

Specifically, the matting agent and the filler may be the same or different.

More specifically, both the matting agent and the filler may be silica, but they may be different in terms of particle size, distribution, content, and the like of the particles. For example, the particle diameter of the matting agent may be 100 nm to 150 nm, and the particle diameter of the filler may be 10 nm to 15 nm, but they are not limited thereto.

The functional layer may further comprise a photoinitiator.

Examples of the photoinitiator include 1-hydroxy-cyclohexyl-phenyl ketone, 2-hydroxy-2-methyl-1-phenyl-1-propanone, 2-hydroxy-1-[4-(2-hydroxyethoxy)phenyl]-2-methyl-1-propanone, methylbenzoylformate, $\alpha,\alpha$-dimethoxy-$\alpha$-phenylacetophenone, 2-benzoyl-2-(dimethylamino)-1-[4-(4-morpholinyl)phenyl]-1-butanone, 2-methyl-1-[4-(methylthio)phenyl]-2-(4-morpholinyl)-1-propanone, diphenyl(2,4,6-trimethylbenzoyl)-phosphine oxide, and bis(2,4,6-trimethylbenzoyl)-phenylphosphine oxide, but it is not limited thereto. In addition, commercially available products include Irgacure 184, Irgacure 500, Irgacure 651, Irgacure 369, Irgacure 907, Darocur 1173, Darocur MBF, Irgacure 819, Darocur TPO, Irgacure 907, and Esacure KIP 100F. The photoinitiator may be used alone or in combination of two or more different types.

The functional layer may comprise a surfactant, a UV absorber, a UV stabilizer, an anti-yellowing agent, a leveling agent, an antifouling agent, or a dye for improving chromaticity values as other additives. In addition, the content of the additives may be variously adjusted within a range that does not impair the physical properties of the functional layer. For example, the content of the additives may be about 0.01% by weight to about 10% by weight based on the total weight of the functional layer, but it is not limited thereto.

The surfactant may be a mono- to bifunctional fluorine-based acrylate, a fluorine-based surfactant, or a silicone-based surfactant. The surfactant may be employed in a form dispersed or crosslinked in the functional layer.

Examples of the UV absorber include benzophenone-based compounds, benzotriazole-based compounds, and triazine-based compounds. Examples of the UV stabilizer include tetramethyl piperidine and the like.

A coating composition may be prepared in order to form the functional layer. The coating composition comprises the organic resin, the filler, the additives, and an organic solvent.

Examples of the organic solvent include alcohol-based solvents such as methanol, ethanol, isopropyl alcohol, and butanol; alkoxy alcohol-based solvents such as 2-methoxyethanol, 2-ethoxyethanol, and 1-methoxy-2-propanol; ketone-based solvents such as acetone, methyl ethyl ketone, methyl isobutyl ketone, methyl propyl ketone, and cyclohexanone; ether-based solvent such as propylene glycol monopropyl ether, propylene glycol monomethyl ether, ethylene glycol monoethyl ether, ethylene glycol monopropyl ether, ethylene glycol monobutyl ether, diethylene glycol monomethyl ether, diethylene glycol monoethyl ether, diethylene glycol monopropyl ether, diethylene glycol monobutyl ether, and diethylene glycol-2-ethylhexyl ether; and aromatic solvents such as benzene, toluene, and xylene, which may be used alone or in combination thereof.

The content of the organic solvent is not particularly limited since it may be variously adjusted within a range that does not impair the physical properties of the coating composition. The organic solvent may be employed such that the weight ratio of the solids content of the components contained in the coating composition to the organic solvent may be about 30:70 to about 99:1. If the content of the organic solvent is within the above range, the composition may have appropriate flowability and coatability.

Since the organic solvent is used in the course of preparing the functional layer, a trace amount of the organic solvent may remain in the functional layer.

Specifically, the coating composition may comprise an organic resin and a filler.

The filler may be employed in the form of a sol dispersed in a solvent. For example, the filler is silica, and the silica may be employed in the form of a silica sol.

The coating composition may comprise a sol in which an organic resin and a filler are dispersed at a weight ratio of 80:20 to 40:60.

Specifically, the coating composition may comprise a sol in which an organic resin and a filler are dispersed at a weight ratio of 80:20 to 50:50, but it is not limited thereto.

The coating composition may be applied to the front or rear side of the base film. The coating composition may be coated by a bar coating method, a knife coating method, a roll coating method, a blade coating method, a die coating method, a microgravure coating method, a comma coating method, a slot die coating method, a lip coating method, or a solution casting method.

Thereafter, the organic solvent contained in the coating composition may be removed. The organic solvent may be removed by evaporation.

Thereafter, the coating composition layer may be cured by light and/or heat.

The functional layer upon complete curing thereof may have a thickness of about 2 μm or more, or about 3 μm or more, for example, about 2 to about 20 μm, about 2 to about 15 μm, about 2 to about 10 μm, or about 3 to about 10 μm.

An additional layer may be further interposed between the base film and the functional layer. The additional layer may be an antistatic layer, which performs an antistatic function, or may be a low refractive index layer, which performs a low reflection function. Alternatively, the functional layer itself may perform an antistatic function and/or a low reflection function.

In addition, the functional layer has a refractive index of 1.45 to 1.60. Specifically, the refractive index of the functional layer may be 1.46 to 1.58, 1.46 to 1.55, 1.46 to 1.52, 1.48 to 1.51, or 1.49 to 1.51, but it is not limited thereto.

As the refractive index of the functional layer satisfies the above range, an excellent reflective appearance of the film may be achieved.

The features on the components and properties of the functional layer as described above may be combined with each other.

Display Device

The display device according to an embodiment comprises a display unit; and a polyamide-based composite film disposed on the display unit, wherein the polyamide-based composite film comprises a base film comprising a polyamide-based polymer and a functional layer disposed on the base film.

The polyamide-based composite film has an in-plane retardation (Re) of 100 nm to 220 nm as measured with light having a wavelength of 550 nm.

Here, details on the base film, the functional layer, the polyamide-based composite film, and the like are as described above.

Specifically, FIG. 1 illustrates a display device, which comprises a display unit (400) and a polyamide-based composite film (300) disposed on the display unit (400), wherein the polyamide-based composite film comprises a base film (100) having a first side (101) and a second side (102) and a functional layer (200), and an adhesive layer (500) is interposed between the display unit (400) and the polyamide-based composite film (300).

The display unit (400) is for displaying an image, and it may have flexible characteristics.

The display unit (400) may be a display panel for displaying an image. For example, it may be a liquid crystal display panel or an organic electroluminescent display panel. The organic electroluminescent display panel may comprise a front polarizing plate and an organic EL panel.

The front polarizing plate may be disposed on the front side of the organic EL panel. Specifically, the front polarizing plate may be attached to the side on which an image is displayed in the organic EL panel.

The organic EL panel displays an image by self-emission of a pixel unit. The organic EL panel may comprise an organic EL substrate and a driving substrate. The organic EL substrate may comprise a plurality of organic electroluminescent units, each of which corresponds to a pixel. Specifically, it may comprise a cathode, an electron transport layer, a light-emitting layer, a hole transport layer, and an anode. The driving substrate is operatively coupled to the organic EL substrate. That is, the driving substrate may be coupled to the organic EL substrate so as to apply a driving signal such as a driving current, so that the driving substrate can drive the organic EL substrate by applying a current to the respective organic electroluminescent units.

In addition, an adhesive layer (500) may be interposed between the display unit (400) and the polyamide-based composite film (300). The adhesive layer may be an optically transparent adhesive layer, but it is not particularly limited.

The polyamide-based composite film (300) is disposed on the display unit (400). The polyamide-based composite film is located at the outermost position of the display device according to an embodiment to thereby protect the display unit.

The polyamide-based composite film (300) may comprise a base film and a functional layer. The functional layer may be at least one selected from the group consisting of a hard coating layer, a reflectance reducing layer, an antifouling layer, and an antiglare layer. The functional layer may be coated on at least one side of the base film.

The polyamide-based composite film according to an embodiment can be applied in the form of a film to the outside of a display device without changing the display driving method, the color filter inside the panel, or the laminated structure, thereby providing a display device having a wide angle of view and excellent visibility. Since neither significant process changes nor cost increases are needed, it is advantageous in that the production costs can be reduced.

The polyamide-based composite film (300) according to an embodiment is not only excellent in optical characteristics in terms of high transmittance, low haze, and low yellow index, but also excellent in mechanical characteristics in terms of excellent curl characteristics, high surface hardness, and low surface roughness.

In particular, as the polyamide-based composite film (300) according to an embodiment has a certain level of in-plane retardation in the visible light region, thereby significantly reducing the distortion caused by light, it is possible to improve the rainbow phenomenon that causes iridescent stains. Accordingly, it can achieve an excellent reflective appearance, so that it is suitable for application to a display device.

In addition, the polyamide-based composite film according to an embodiment satisfies a specific level of three-dimensional surface roughness, resulting in a texture similar to that of glass. Thus, when the polyamide-based composite film is applied to a display device, it does not give users a sense of difference in texture, and it has an aesthetic feeling similar to that of glass, so that it can be advantageously used as a substitutive film for glass.

As a result, since it is lightweight and excellent in flexibility as compared with glass and satisfies high surface hardness characteristics at the same time, it can be advantageously applied to a foldable display device or a flexible displace device.

Embodiments for Carrying Out the Invention

Hereinafter, the present invention will be described in more detail with reference to the following examples. However, these examples are set forth to illustrate the present invention, and the scope of the present invention is not limited thereto.

EXAMPLE

Example 1

A 1-liter glass reactor equipped with a temperature-controllable double jacket was charged with 779.1 g of dimethylacetamide (DMAc) as an organic solvent at 20° C. under a nitrogen atmosphere. Then, 0.2 mole of 2,2'-bis (trifluoromethyl)-4,4'-diaminobiphenyl (TFMB) was slowly added thereto for dissolution thereof. Subsequently, 0.014 mole of 2,2'-bis(3,4-dicarboxyphenyl)hexafluoropropane dianhydride (6-FDA) was slowly added thereto, and the mixture was stirred for 1 hour. Then, 0.142 mole of isophthaloyl chloride (IPC) was added, followed by stirring for 1 hour. And 0.044 mole of terephthaloyl chloride (TPC) was added, followed by stirring for 1 hour, thereby preparing a polymer solution. Thereafter, 500 ppm of silica (average particle diameter: 100 nm to 150 nm) was added as a matting agent to the polymer solution thus prepared based on the total weight of the polyamide-based polymer, which was stirred.

The polymer solution thus obtained was coated onto a glass plate and then dried with hot air at 80° C. for 30 minutes. It was detached from the glass plate, fixed to a pin frame, and thermally treated with hot air in a temperature range of 80° C. to 300° C. at a temperature elevation rate of 2° C./minute to obtain a polyamide-based film (or base film) having a thickness of 50 μm.

As to the contents of TFMB, 6FDA, IPC, and TPC, the number of moles of the dianhydride compound and the dicarbonyl compounds based on 100 moles of the diamine compound is shown in Table 1.

A hard coating layer was formed on one side of the base film thus prepared. In order to form the hard coating layer, 54.32 parts by weight of a urethane acrylate oligomer (PU2050, Miwon Specialty Chemical), 23.28 parts by weight of a polyfunctional acrylate monomer (M300, Miwon Specialty Chemical), 19.4 parts by weight of a silica sol (MA-ST, Nissan Chemical) in which fine silica particles (average particle diameter: 10 nm to 15 nm) were dispersed in methanol in 30% by weight, and 3 parts by weight of a photoinitiator (1-184, BASF) were compounded with a stirrer to prepare a composition for forming a hard coating.

Thereafter, 100 parts by weight of methyl isobutyl ketone as a solvent was added thereto based on 100 parts by weight of the solids content of the composition for forming a hard coating, which was stirred and then applied to one side of the prepared polyamide-based film (or base film) by a die coating method. Thereafter, it passed through a drying chamber at 80° C. to dry the solvent for about 1 minute and then cured by irradiating an ultraviolet ray of a high-pressure mercury lamp at a light dose of 1,000 mJ/cm$^2$, thereby forming a coating film in a thickness of 5 μm. As a result, a polyamide-based composite film comprising a base film and a hard coating layer (or functional layer) was prepared. In addition, the content (ppm) of silica present in the prepared composite film is shown in Table 1 based on the total weight of the functional layer.

Examples 2 to 6 and Comparative Examples 1 and 2

Films were prepared in the same manner as in Example 1, except that the contents of the reactants and the like were changed as shown in Table 1 below.

EVALUATION EXAMPLE

The base films and polyamide-based composite films prepared in Examples 1 to 6 and Comparative Examples 1 and 2 were each measured and evaluated for the following properties. The results are shown in Table 1 below.

Evaluation Example 1: Measurement of Film Thickness

The thickness was measured at 5 points in the transverse direction using a digital micrometer 547-401 manufactured by Mitutoyo Corporation. Their average value was adopted as the thickness.

Evaluation Example 2: Measurement of Surface Roughness

The surface roughness was measured using AFM (atomic force microscopy) equipment.

Specifically, the model XE-150 of Park Systems was used, and the conditions were 1.0 Hz, scan area of 20 μm×20 μm, and non-contact cantilever PPP-NCHR 10M. Upon preparation of the base film, the surface roughness of the side on which the functional layer was to be disposed was measured.

Evaluation Example 3: Measurement of Refractive Index

The refractive index was measured using a prism coupler.

Specifically, model name SPA-4000 of Sairon Technology was used. Under the condition of 550 nm at room temperature, the film to be measured was fixed in contact with the prism, and the refractive index was measured while the incident angle of the laser beam passing through the prism was changed.

The refractive index of the base film alone and the refractive index of the polyamide-based composite film were measured, respectively.

Evaluation Example 4: Measurement of Developed Interfacial Area Ratio (Sdr)

The developed interfacial area ratio was measured using a confocal laser scanning microscope.

Specifically, the developed interfacial area ratio of one side of the base film was measured according to the following equation using LSM 5 pascal of Carl Zeiss in accordance with the ISO 25178-2:2012 standard.

$$\text{Developed interfacial area ratio } (Sdr)(\%) = \frac{\{\text{surface area} - (Lx \times Ly)\}}{(Lx \times Ly)} \times 100$$

In the equation for calculating the developed interfacial area ratio, the surface area refers to a surface area where the horizontal length is Lx (cm) and the vertical length is Ly (cm).

Evaluation Example 5: Measurement of Transmittance and Haze

The light transmittance and haze were measured using a haze meter NDH-5000W manufactured by Nippon Denshoku Kogyo in accordance with the JIS K 7105 standard.

Evaluation Example 6: Measurement of Surface Hardness

The pencil hardness was measured using a pencil hardness tester of Kipae ENT and Pressure-Proofed Hi-Density Lead Pencil of Mitsubishi Japan.

Specifically, after the polyamide-based composite film was prepared, the surface hardness of one side of the functional layer positioned opposite to the side on which the base film was disposed was measured. It was fixed to the glass substrate of the pencil hardness tester such that the functional layer faced upward, Mitsubishi pencil was installed at an angle of 45 degrees to the surface of the functional layer, the surface of the functional layer was scratched 5 times under a load of 750 g, and the presence or absence of scratches was observed to determine the hardness.

Evaluation Example 7: Evaluation of Curling

The polyamide-based composite films of the Examples and Comparative Examples were each cut to a size of 10 cm×10 cm, it was placed on a glass plate such that the base film was in contact with the glass plate (that is, the functional layer faced upward), and the height distanced from the 4 corners of the glass plate was measured at 25° C. and 50% RH. The average value thereof was obtained.

Evaluation Example 8: Measurement of In-Plane Retardation (Re)

The polyamide-based composite films according to the Example and Comparative Example were each cut to a size of 10 cm×10 cm, and it was measured with light having a wavelength of 550 nm using a retarder (Axoscan equipment manufactured by Axometrics).

Evaluation Example 9: Measurement of Three-Dimensional Surface Roughness

The three-dimensional surface roughness was measured using a 3D optical profiler.

Specifically, Bruker's model name Optical Profiler Contour GT was used. An image was taken by the 3D optical profiler in the region of 220 μm×220 μm, and the roughness was measured therefrom. After the polyamide-based composite film was prepared, the surface roughness of one side of the functional layer positioned opposite to the side on which the base film was disposed was measured.

Specifically, the Sa roughness (arithmetical mean height), Sp roughness (maximum peak height), Sv roughness (maximum groove depth), and Sz roughness (maximum height) as the three-dimensional surface roughness parameters are described.

TABLE 1

|  |  | Ex. 1 | Ex. 2 | Ex. 3 | Ex. 4 |
|---|---|---|---|---|---|
| Composition and thickness of the base film | Diamine | TFMB 100 | TFMB 100 | TFMB 100 | TFMB 100 |
|  | Dianhydride | 6FDA 7 | 6FDA 7 | 6FDA 7 | 6FDA 7 |
|  | Dicarbonyl compound | IPC 71 TPC 22 | IPC 71 TPC 22 | IPC 71 TPC 22 | IPC 71 TPC 22 |
|  | Matting agent (type, content) | Silica 500 ppm | Silica 500 ppm | Silica 500 ppm | Silica 500 ppm |
|  | Surface roughness (Ra) (μm) | 0.010 | 0.010 | 0.010 | 0.010 |

TABLE 1-continued

|  |  |  |  |  |  |
|---|---|---|---|---|---|
|  | Refractive index | 1.632 | 1.632 | 1.632 | 1.632 |
|  | Developed interfacial area ratio (%) | 0.0013 | 0.0013 | 0.0013 | 0.0013 |
|  | Thickness (μm) | 50 | 50 | 50 | 50 |
| Composition and thickness of the functional layer | A: PU2050 (7) + M300 (3) | 80 | 70 | 60 | 50 |
|  | B: MA-ST (silica sol) | 20 | 30 | 40 | 50 |
|  | Thickness (μm) | 5 | 5 | 5 | 5 |
|  | Content of silica (ppm) | 70,000 | 114,000 | 167,000 | 231,000 |

|  |  | Ex. 5 | Ex. 6 | C. Ex. 1 | C. Ex. 2 |
|---|---|---|---|---|---|
| Composition and thickness of the base film | Diamine | TFMB 100 | TFMB 100 | TFMB 100 | TFMB 100 |
|  | Dianhydride | 6FDA 7 | 6FDA 7 | 6FDA 7 | 6FDA 7 |
|  | Dicarbonyl compound | IPC 71 TPC 22 | IPC 71 TPC 22 | IPC 71 TPC 22 | IPC 71 TPC 22 |
|  | Matting agent (type, content) | Silica 50 ppm | Silica 50 ppm | Silica 50 ppm | Silica 50 ppm |
|  | Surface roughness (Ra) (μm) | 0.005 | 0.005 | 0.005 | 0.005 |
|  | Refractive index | 1.635 | 1.635 | 1.635 | 1.635 |
|  | Developed interfacial area ratio (%) | 0.0004 | 0.0004 | 0.0004 | 0.0004 |
|  | Thickness (μm) | 50 | 50 | 50 | 50 |
| Composition and thickness of the functional layer | A: PU2050 (7) + M300 (3) | 100 | 90 | 40 | 30 |
|  | B: MA-ST (silica sol) | 0 | 10 | 60 | 70 |
|  | Thickness (μm) | 5 | 5 | 5 | 5 |
|  | Content of silica (ppm) | 0 | 32,000 | 310,000 | 412,000 |

Regarding A in the composition of the functional layer, PU2050 and M300 were mixed at a weight ratio of 7:3. Regarding the composition of the functional layer, A and B were mixed at a weight ratio shown in Table 1.

The content of silica in the functional layer refers to the content (ppm) contained based on the total weight of the functional layer.

TABLE 2

|  |  | Ex. 1 | Ex. 2 | Ex. 3 | Ex. 4 | Ex. 5 | Ex. 6 | C. Ex. 1 | C. Ex. 2 |
|---|---|---|---|---|---|---|---|---|---|
| Properties of the polyamide-based composite film | Transmittance (%) | 91.76 | 92.04 | 91.97 | 91.85 | 91.86 | 92.07 | 91.64 | 90.05 |
|  | Haze (%) | 0.40 | 0.41 | 0.40 | 0.43 | 0.37 | 0.40 | 0.42 | 0.67 |
|  | Refractive index | 1.495 | 1.505 | 1.508 | 1.510 | 1.489 | 1.493 | 1.547 | 1.592 |
|  | Surface hardness | 5H | 5H | 5H | 6H | 4H | 4H | 7H | 6H |
|  | Evaluation of curling | 4 mm | 5 mm | 7 mm | 9 mm | 0 mm | 2 mm | 15 mm | 29 mm |
|  | In-plane retardation Re (nm) | 150.5 | 179.3 | 183.4 | 192.7 | 103.5 | 133.6 | 225.1 | 313.4 |
|  | Sa (μm) | 0.008 | 0.023 | 0.037 | 0.043 | 0.002 | 0.003 | 0.094 | 0.176 |
|  | Sp (μm) | 0.07 | 0.14 | 0.36 | 0.81 | 0.01 | 0.01 | 1.61 | 1.92 |
|  | Sv (μm) | 0.24 | 0.31 | 0.53 | 0.87 | 0.08 | 0.10 | 1.80 | 2.03 |
|  | Sz (μm) | 0.31 | 0.45 | 0.89 | 1.68 | 0.09 | 0.11 | 3.41 | 3.95 |

As confirmed from Tables 1 and 2 above, the polyamide-based composite films of Examples 1 to 6 had an in-plane retardation of 100 nm to 220 nm at a wavelength of 550 nm. Thus, they are effective in preventing reflection in the visible light region, and they can remarkably reduce the rainbow phenomenon.

Accordingly, when the polyamide-based composite films of Examples 1 to 6 are applied to a cover window for a display device and to a display device, it is possible to technically control the color distortion caused by overlapping interference on the screen, thereby achieving an excellent reflective appearance.

In addition, the polyamide-based composite films of Examples 1 to 6 satisfied an Sa roughness (arithmetical mean height) of 0.008 μm to 0.08 μm in three-dimensional surface roughness parameters. In particular, the polyamide-based composite films according to Examples 1 to 4 satisfied an Sa roughness of 0.005 μm to 0.08 μm. Thus, it is possible to achieve a texture similar to that of glass.

Accordingly, when the polyamide-based composite films are applied to a cover window for a display device and to a display device, they do not give users a sense of difference in texture. Thus, they are suitable for a substitutive film for glass.

In addition, the polyamide-based composite films according to Examples 1 to 6 had an average height of the four corners of 10 mm or less in the evaluation of curling, indicating excellent curling characteristics. Further, the polyamide-based composite films according to Examples 1 to 4 had a surface hardness of 4 H or higher as well, indicating excellent mechanical properties.

Specifically, as they are applied as a base film that satisfies a specific level of surface roughness, refractive index, and developed interfacial area ratio, it is possible to achieve a polyamide-based composite film having the desired in-plane retardation, refractive index, and three-dimensional surface roughness values. Further, it is possible to achieve a polyamide-based composite film with enhanced durability such as resistance to detachment while a composition for forming a functional layer can be readily coated and the compatibility between the base film and the functional layer is excellent.

In the polyamide-based composite films of Examples 5 and 6, the in-plane retardation satisfied the desired level, whereas the Sa roughness was relatively small, making them too slippery. Thus, when they are applied to a display device, they give a sense of difference in texture to some extent. Since they have a low surface hardness, their mechanical properties are deteriorated.

In contrast, in the polyamide-based composite films of Comparative Examples 1 and 2, the in-plane retardation exceeded the desired level, resulting in a problem that the rainbow phenomenon was noticed. As the Sa roughness also exceeded the desired range, it was not suitable for a substitutive film for glass. Although the surface hardness was excellent, they showed significantly lowered curling characteristics.

EXPLANATION OF REFERENCE NUMERALS

| | |
|---|---|
| 10: polymerization apparatus | 20: tank |
| 30: belt | 40: thermosetting device |
| 50: winder | |
| 100: base film | |
| 101: first side | 102: second side |
| 200: functional layer | 300: polyamide-based composite film |
| 400: display unit | 500: adhesive layer |

The invention claimed is:

1. A polyamide-based composite film, which comprises a base film comprising a polyamide-based polymer; and a functional layer disposed on the base film, and which has an in-plane retardation (Re) of 100 nm to 220 nm as measured with light having a wavelength of 550 nm,
wherein the polyamide-based composite film has a refractive index of 1.48 to 1.54.

2. The polyamide-based composite film of claim 1, which has an Sa roughness (arithmetical mean height) of 0.005 μm to 0.08 μm in three-dimensional surface roughness parameters.

3. The polyamide-based composite film of claim 1, which, in three-dimensional surface roughness parameters, has an Sp roughness (maximum peak height) of 0.05 μm to 1.6 μm, an Sv roughness (maximum pit depth) of 0.04 μm to 1.5 μm, and an Sz roughness (maximum height) of 0.09 μm to 3.1 μm.

4. The polyamide-based composite film of claim 1, wherein the surface hardness of one side of the functional layer positioned opposite to the side on which the base film is disposed is 5H or higher.

5. The polyamide-based composite film of claim 1, wherein the base film has a surface roughness (Ra) of 0.005 μm to 0.050 μm.

6. The polyamide-based composite film of claim 1, wherein the base film has a refractive index of 1.620 to 1.650.

7. The polyamide-based composite film of claim 1, wherein the base film has a developed interfacial area ratio (Sdr) of 0.0005% to 0.0050%.

8. The polyamide-based composite film of claim 1, wherein the base film further comprises a matting agent, and the content of the matting agent is 100 to 3,000 ppm based on the total weight of the polyamide-based polymer.

9. The polyamide-based composite film of claim 8, wherein the matting agent is at least one selected from the group consisting of silica, poly(methyl methacrylate) (PMMA), poly(butyl methacrylate) (PBMA), polystyrene (PS), melamine, silicone, barium sulfate, and glass.

10. The polyamide-based composite film of claim 1, wherein the polyamide-based polymer comprises a repeat unit represented by the following Formula A and a repeat unit represented by the following Formula B at a molar ratio of 0:100 to 50:50:

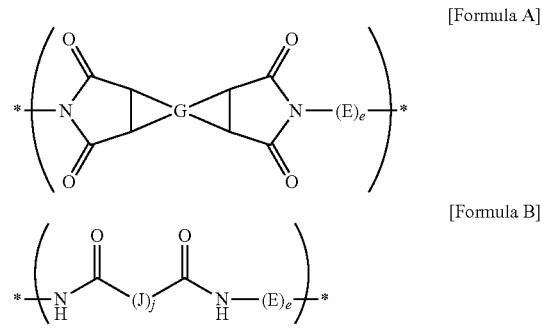

in Formulae A and B, E and J are each independently selected from a substituted or unsubstituted divalent $C_6$-$C_{30}$ aliphatic cyclic group, a substituted or unsubstituted divalent $C_4$-$C_{30}$ heteroaliphatic cyclic group, a substituted or unsubstituted divalent $C_6$-$C_{30}$ aromatic cyclic group, a substituted or unsubstituted divalent $C_4$-$C_{30}$ heteroaromatic cyclic group, a substituted or unsubstituted $C_1$-$C_{30}$ alkylene group, a substituted or unsubstituted $C_2$-$C_{30}$ alkenylene group, a substituted or unsubstituted $C_2$-$C_{30}$ alkynylene group, —O—, —S—, —C(=O)—, —CH(OH)—, —S(=O)$_2$—, —Si(CH$_3$)$_2$—, —C(CH$_3$)$_2$—, and —C(CF$_3$)$_2$—, e and j are each independently selected from integers of 1 to 5, when e is 2 or more, then the two or more Es are the same as, or different from, each other, when j is 2 or more, then the two or more Js are the same as, or different from, each other, and G is a substituted or unsubstituted tetravalent $C_6$-$C_{30}$ aliphatic cyclic group, a substituted or unsubstituted tetravalent $C_4$-$C_{30}$ heteroaliphatic cyclic group, a substituted or unsubstituted tetravalent $C_6$-$C_{30}$ aromatic cyclic group, or a substituted or unsubstituted tetravalent $C_4$-$C_{30}$ heteroaromatic cyclic group, wherein the aliphatic cyclic group, the heteroaliphatic cyclic group, the aromatic cyclic group, or the heteroaromatic cyclic group is present alone, fused to each other to form a condensed ring, or bonded by a bonding group selected from a substituted or unsubstituted $C_1$-$C_{30}$ alkylene group, a substituted or unsubstituted $C_2$-$C_{30}$ alkenylene group, a substituted or unsubstituted $C_2$-$C_{30}$ alkynylene group, —O—, —S—, —C(=O)—, —CH(OH)—, —S(=O)$_2$—, —Si(CH$_3$)$_2$—, —C(CH$_3$)$_2$—, and —C(CF$_3$)$_2$—.

11. The polyamide-based composite film of claim 1, wherein the functional layer further comprises a filler, the content of the filler is 40,000 ppm to 300,000 ppm based on the total weight of the functional layer, and the filler has an average particle diameter of 5 nm to 100 nm.

12. The polyamide-based composite film of claim 1, which has a haze of 1% or less, and a transmittance of 80% or more.

13. A display device, which comprises a display unit; and a polyamide-based composite film disposed on the display unit, wherein the polyamide-based composite film comprises a base film comprising a polyamide-based polymer; and a functional layer disposed on the base film, and wherein the polyamide-based composite film has an in-plane retardation (Re) of 100 nm to 220 nm as measured with light having a wavelength of 550 nm, and a refractive index of 1.48 to 1.54.

* * * * *